United States Patent
Levin et al.

(10) Patent No.: US 9,570,956 B2
(45) Date of Patent: Feb. 14, 2017

(54) PLANETARY, PUSH-PULL ELECTROMAGNETIC MOTOR

(76) Inventors: Shalom Levin, Atlit (IL); Asaf Levin, Atlit (IL)

(*) Notice: Subject to any disclaimer, the term of this patent is extended or adjusted under 35 U.S.C. 154(b) by 475 days.

(21) Appl. No.: 14/004,680

(22) PCT Filed: Mar. 15, 2012

(86) PCT No.: PCT/IL2012/000121
§ 371 (c)(1),
(2), (4) Date: Oct. 8, 2013

(87) PCT Pub. No.: WO2012/123937
PCT Pub. Date: Sep. 20, 2012

(65) Prior Publication Data
US 2014/0184002 A1    Jul. 3, 2014

Related U.S. Application Data

(60) Provisional application No. 61/453,150, filed on Mar. 16, 2011, provisional application No. 61/603,303, filed on Feb. 26, 2012.

(51) Int. Cl.
| | |
|---|---|
| *H02K 41/06* | (2006.01) |
| *H02K 7/116* | (2006.01) |
| *H02K 7/08* | (2006.01) |

(52) U.S. Cl.
CPC .............. *H02K 7/116* (2013.01); *H02K 7/08* (2013.01); *H02K 41/06* (2013.01)

(58) Field of Classification Search
CPC ........ H02K 41/06; H02K 51/00; H02K 7/116; H02K 7/08

USPC .................. 310/49.37, 90, 83, 103
See application file for complete search history.

(56) References Cited

U.S. PATENT DOCUMENTS

| | | | |
|---|---|---|---|
| 2,703,370 A | 3/1955 | Steensen | |
| 3,334,253 A * | 8/1967 | Hill | H02K 41/06 310/83 |
| 3,538,360 A | 11/1970 | Ludemann et al. | |
| 3,560,774 A | 2/1971 | Reeves | |

(Continued)

FOREIGN PATENT DOCUMENTS

| | | |
|---|---|---|
| GB | 823071 | 11/1959 |
| JP | 61126426 | 6/1986 |
| RU | 2250475 | 7/2003 |

*Primary Examiner* — Michael Andrews
(74) *Attorney, Agent, or Firm* — Edward Langer, Adv. and Patent Attorney

(57) ABSTRACT

A planetary push-pull electric motor comprising a ring stator fixedly mounted on the central axis of the planetary push-pull electric motor; a planetary rotor arranged to be magnetically movable around an inner circumference of the ring stator, the planetary rotor rotatably mounted on an eccentric rotor axis in respect to the central axis of the ring stator; a series of electromagnets radially mounted about the ring stator for generating magnetic fields; and a means for transferring rotation of the eccentric planetary rotor axis to directly power an output shaft, wherein when the series of electromagnets are activated, the planetary rotor is magnetically impelled to pivot and roll from one temporary, moving contact line to an adjacent one, creating a rotary moment upon each of the temporary, moving contact lines, providing a power output.

25 Claims, 33 Drawing Sheets

(56) References Cited

U.S. PATENT DOCUMENTS

| | | | |
|---|---|---|---|
| 3,770,997 A * | 11/1973 | Presley | H02K 41/06 310/82 |
| 4,445,596 A | 5/1984 | Waters et al. | |
| 4,649,307 A | 3/1987 | Bech | |
| 4,751,411 A | 6/1988 | Fukaya et al. | |
| 4,947,070 A | 8/1990 | Hill et al. | |
| 5,025,915 A | 6/1991 | Huber | |
| 5,672,923 A | 9/1997 | Jacobsen et al. | |
| 6,440,029 B1 | 8/2002 | Battlogg | |
| 6,661,139 B1 | 12/2003 | Moskob | |
| 6,696,965 B2 | 2/2004 | Stout et al. | |
| 7,898,135 B2 | 3/2011 | Flynn | |
| 8,598,754 B2 | 12/2013 | Lacour | |
| 2011/0012454 A1 | 1/2011 | Wilson et al. | |

\* cited by examiner

PLANETARY, PUSH-PULL ELECTROMAGNETIC MOTOR

CROSS REFERENCE TO RELATED APPLICATIONS

The present Application is based on U.S. Provisional Application No. 61/453,150, filed on Mar. 16, 2011 and U.S. Provisional Application No. 61/603,303, filed Feb. 26, 2012.

FIELD OF THE INVENTION

The present invention is related to the field of electric motors, and in particular to a planetary, push-pull electromagnetic motor (hereinafter designated 'PPPEW') whose operation is based on the dynamics of the physical interaction under a magnetic field between a stator and a planetary rotor whose axes of rotation are eccentric in relation to each other.

BACKGROUND OF THE INVENTION

Electric motors are widely used in our modern life: in industrial applications; in land vehicles, such as cars, trucks, and mobile machinery; in airplanes and other airborne vehicles; in military applications; in mechanical and electrical devices used in medical technology; and in home appliances.

As the demand for electric motors has increased over the years—and continues to do so—many types of motors have been developed to satisfy the wide variety of applications and needs of our technologically oriented society. In the field of electric motors, for example, we can find high- and low-speed rotary motors, torque motors, linear motors, nanomotion motors, and many more, each developed to meet a specific purpose or purposes.

Since the invention of the first motor concept about 180 years ago, the construction of electric motors has been based on the concept of an internal, rotating body called a rotor and an outer, stationary body called the stator, each of which was concentrically located in respect to the other. The electromagnetic interaction between these two elements produces S-shaped magnetic lines which are then induced to be straightened, and the resultant semi-tangential vector results in the production of rotational moment.

In consideration of the weight-to-power ratio of lightweight electric motors, it is understood that a small, lightweight motor makes a trade-off due to its size in that the motor velocity is generally of a very high speed if the motor is small. Consequently, a high-reduction gear box is needed to obtain the desired speed.

In many applications gearboxes need to be used to engage with electric motors, either to reduce the speed and/or to increase the moment, or to convert a rotary movement into a linear movement. In practice, a parallel gear train gearbox, a planetary gearbox, or harmonic drive reducer can be used to reduce or increase rotary motor speed and/or moment. Alternatively, a screw and nut, or rake and pinion, can be used to convert rotary movement into linear movement.

Gearboxes that are connected to electric motors suffer from a few disadvantages. Gearboxes are normally connected to electric motors in serial, which increases the total assembly length and/or diameter of the combined unit. The weight of gearboxes is generally high. Furthermore, the add-on gear assembly tends to be noisy, expensive, and of low efficiency.

Thus it would be desirable to provide an innovative planetary, push-pull electromagnetic motor (PPPEM) that overcomes the above-mentioned disadvantages and improves on the current concept.

SUMMARY OF THE INVENTION

Accordingly, it is a principal object of the present invention to overcome the disadvantages and limitations of prior art systems and to provide an improved electric motor comprising a planetary push-pull electromagnetic motor PPPEM and based on the interaction, when operated, between a stator, configured with a series of electromagnets arranged radially around the stator axis, and a planetary rotor, disposed eccentrically to the stator.

It should be understood that the use of the term "PPPEM" is meant to convey the general idea that a PPPEM, when activated, produces output power by planetary rotor rolling motion in two major ways: by offset, pivotal motion of a gear-type planetary rotor in dynamic mesh contact n with a stator ring-gear, or, alternatively, by offset rotation of a friction-type planetary rotor in friction contact with a ring-stator. Both types of planetary rotors are impelled to pivot by an electromagnetic force applied at a sequential series of moving, mesh pivot lines (see orthographic view of item 60 in FIG. 24). The PPPEM can be activated by either a magnetic attraction (pull) or a repulsion (push) force, depending on the particular embodiment of the invention as described herein. Unless otherwise stated (and intended as only one or the other), PPPEM refers to the use of both push and pull electromagnetic forces in the operation of the present invention.

It is another object of the present invention to provide a PPPEM having a planetary rotor comprising a soft, ferromagnetic core whose stator electromagnets induce only a pull magnetic force.

It is yet another object of the present invention to provide a PPPEM having a radial magnet-ring, planetary rotor.

It is a further object of the present invention to provide a PPPEM having a tubular, radial-magnet planetary rotor.

It is still another object of the present invention to provide a planetary push electric motor having a radial magnet-ring, planetary rotor.

It is another object of the present invention to provide a PPPEM where the stator magnetic forces radially push and/or pull a planetary rotor so that its axis is collinear with an outer mesh pivot contact line.

It is yet another object of the present invention to provide a PPPEM having a radial magnet-ring rotor integral to a rotor gear and operable utilizing both push and pull electromagnetic forces to produce the planetary rotation of the rotor, which is integral to a rotor gear, upon a stator ring-gear, resulting in a torque at a moving, mesh pivot contact line formed between the stator gear and rotor gear.

It is still another object of the present invention to provide a PPPEM having a series of stator electromagnets encased in soft, ferromagnetic cases forming a core so as to concentrate magnetic flux from the magnetic poles of each encased electromagnet towards the active face of each of a series of holding electromagnets in closest proximity to the planetary rotor when the PPPEM is activated.

It is still another object of the present invention to provide a built-in planetary mesh where the stator is a magnet ring-gear and the rotor is a planetary gear.

It is another object of the present invention to provide a PPPEM free of the need for add-on gear boxes.

It is yet another object of the present invention to provide a PPPEM having a built-in, semi-dual-stage planetary gear.

It is still another object of the present invention to provide an eccentrically floating axis, radially loaded from the planetary rotor toward the stator.

It is a further object of the present invention to provide a planetary pull electromagnetic motor having a zero backlash mechanism loaded by the pull magnetic forces between a stator and an eccentric planetary rotor.

It is still a further object of the present invention to provide a PPPEM having a zero backlash mechanism loaded by springs that radially force a planetary rotor gear against a stator gear.

It is another object of the present invention to provide a PPPEM having a built-in, oversized, planetary rotor gear.

It is yet another object of the present invention to provide an almost zero air gap, high-efficiency PPPEM.

It is a further object of the present invention to provide a PPPEM with an eccentric planetary rotor for specific applications comprising only a 30 degree segmental portion of a ring stator and a like, respective portion of a series of electromagnets.

It is still another object of the present invention to provide a PPPEM with an eccentrically mounted, planetary rotor that operates with push-pull electromagnets in an exterior ring stator.

It is still another object of the present invention to provide a PPPEM with a planetary rotor for gearless control of a fixedly attached, rotatable lead screw shaft provided with a laterally movable nut for attachment to devices requiring a mechanism for simple back and forth movement.

Therefore there is provided a planetary push-pull electromagnetic motor (hereinafter "PPPEM") comprising:

a ring stator fixedly mounted on a central axis of the PPPEM, wherein the central axis defines a ring stator centerline;

a planetary rotor arranged to be magnetically movable, rotatably mounted on an eccentric rotor axis in respect to the ring stator centerline; wherein said planetary rotor comprises a primary planetary gear in mesh contact with said stator gear, and a secondary step-gear integral with said primary planetary gear in planetary mesh contact with an output ring-gear;

a series of electromagnets radially mounted about the ring stator centerline for generating radial magnetic force upon the magnetic fields of the planetary rotor when the series of electromagnets is activated;

a means for transferring rotation of the eccentric planetary rotor axis to directly power an output shaft of the PPPEM, wherein when the series of electromagnets is activated, radial push-pull magnetic forces are generated, magnetically impelling the planetary rotor in proximal radial contact with at least one electromagnet in the series the secondary step-gear acting as a reducer, so as to minimize the offset between the stator axis and the rotor axis to provide a high gear-ratio directly to the output shaft in alignment with the stator central axis, such that the planetary rotor pivots from one of the proximal tangential contacts to an adjacent one in sequence, effecting a continuous rolling motion of the planetary rotor about the eccentric rotor axis and creating a rotary moment, such rolling motion being translated into rotational motion which, when applied to the planetary rotor output shaft of the PPPEM utilizing the rotation transfer means, provides a source of power output from the PPPEM.

Further features and advantages of the present invention will be apparent from the drawings attached and the description contained herein.

BRIEF DESCRIPTION OF THE DRAWINGS

For a better understanding of the invention with regard to the embodiments thereof, reference is made to the accompanying drawings, in which like numerals designate corresponding elements or sections throughout and in which.

DETAILED DESCRIPTION OF THE PREFERRED EMBODIMENTS

Figure 1:
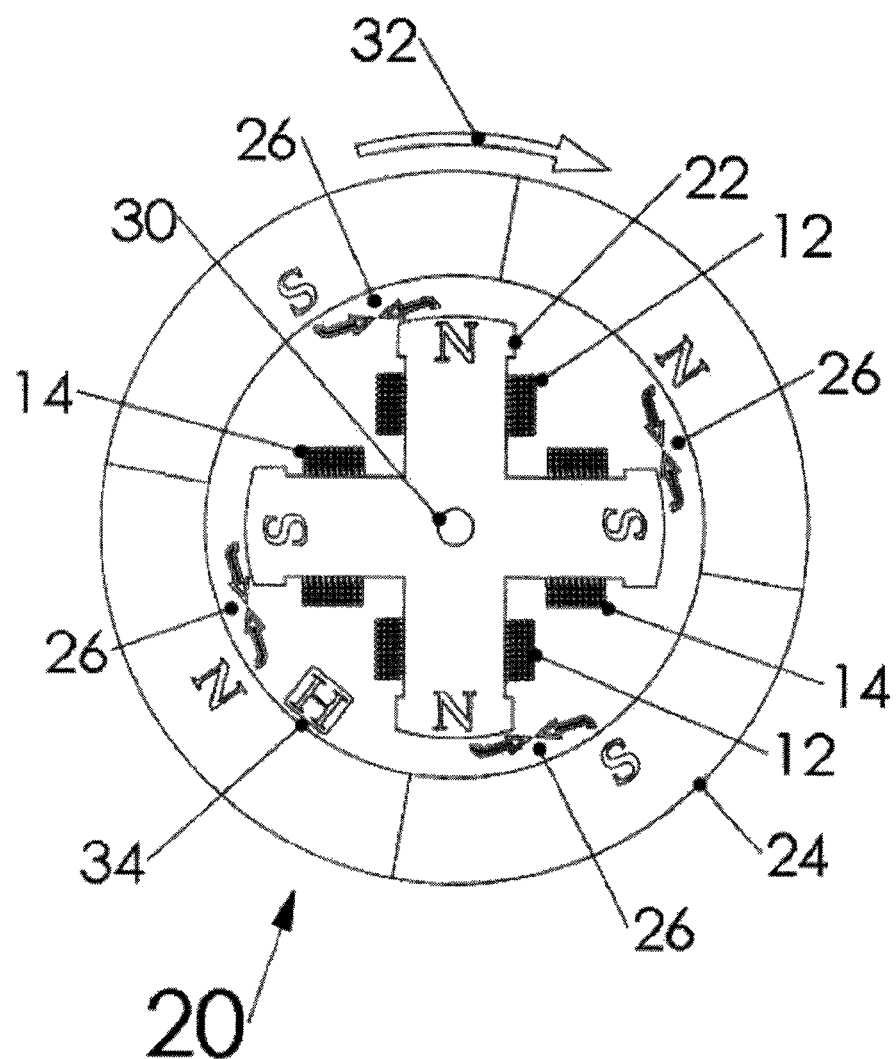
FIG. 1 illustrates a typical, prior-art electric motor constructed with an internally mounted stator and externally mounted rotor.

With reference to the drawings, FIG. 1 shows a general schematic overview of a typical, prior-art electric motor 20 provided with an internally mounted stator 22 having electromagnetic coils 12, 14 and an externally mounted rotor 24 comprising alternating adjacent magnetic poles marked North (N) and South (S). The axes of both rotor 24 and stator 22 are coaxial at point 30 and output to a drive shaft (not shown) is directly along the same axis at point 30.

When prior art electric motor 20 is activated, South (S) magnetic poles at electromagnet coils 14 of stator 22 each attract the nearest North (N) magnetic pole on rotor 24, attempting to "pull" the North (N) poles of rotor 24 closer to their nearest oppositely-charged counterparts on stator 22 in accordance with the physical principle that opposite magnetic poles attract. When polarity is reversed, North (N) magnetic poles at coils 12 operate in a similar manner with their oppositely-charged counterparts on stator 22.

The lines of pulling magnetic force are indicated by S-shaped arrows 26. The S-shaped arrows 26 attempt to straighten, since magnetic lines tend to move in the shortest possible paths, thus causing rotor 24 to rotate in a clockwise direction around a fixed, common central axis 30 between rotor 24 and stator 22 and impelling rotor 24 to rotate as indicated by arrow 32.

A Hall Effect sensor 34 is provided in proximity to rotor 24 for measuring magnetic flux when prior art electric motor 20 is operated.

Figure 2A:
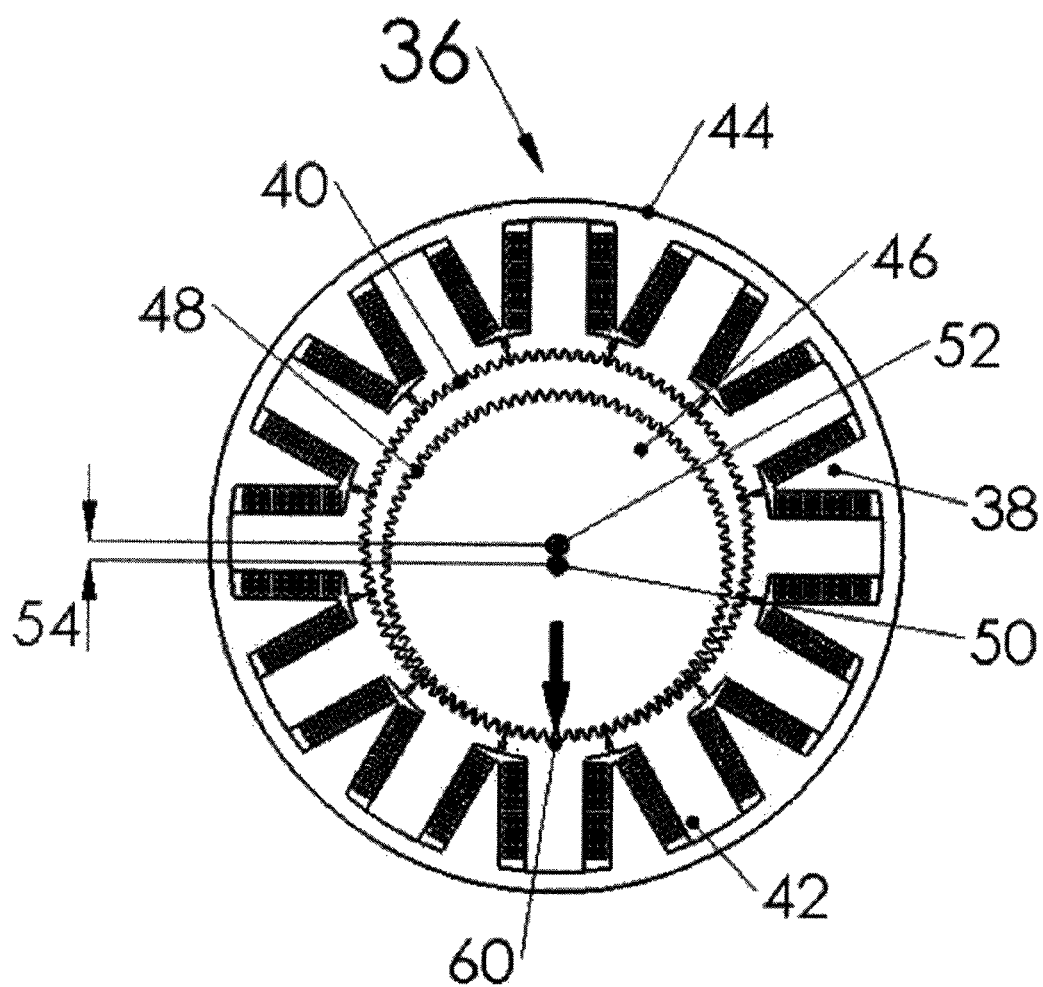
FIG. 2A shows a transverse, sectional view of a PPPEM with pull magnetic poles constructed in accordance with a preferred embodiment of the present invention.

FIG. 2A shows a sectional view of a PPPEM constructed in accordance with a preferred embodiment of the present invention.

PPPEM 36 comprises an externally mounted stator 38 having a stator ring-gear 40 and a series of radially mounted electromagnets 42 surrounded by and housed within a stator envelope 44. PPPEM 36 further comprises an internally mounted planetary rotor 46 having a planetary gear 48. The axis of PPPEM 36 is coaxial with stator axis 52, i.e., in line with an output shaft (not shown), while the rotor axis 50 is offset to a small degree, as indicated by eccentricity gap 54 (opposing arrows), making planetary rotor gear 48 eccentrically disposed in relation to stator gear 40.

Note that, for clarity, both axes 50, 52 are indicated by enlarged points located in the central area of rotor 46.

Power to an output shaft (not shown) is generated through the planetary rotation of rotor gear 48 on a moving, pivot contact line 60 (shown as a point indicated by dark arrow) to advance rotor gear 48 when magnetic pull forces are activated during operation of electromagnets 42.

In a preferred embodiment of the present invention, both planetary rotor 46 and stator 38 are made of soft iron.

Rotor gear 48 and stator ring-gear 40 are in mesh contact with each other during operation. Planetary rotor 46 is impelled to move sequentially from one mesh pivot contact line 60 to another (see FIG. 2B) under the impetus of the activated magnetic forces generated by stator electromagnets 42. A set of output planetary gears (not shown) having high-tensile strength is provided to produce torque directly on a motor output shaft (not shown).

Figure 2B:
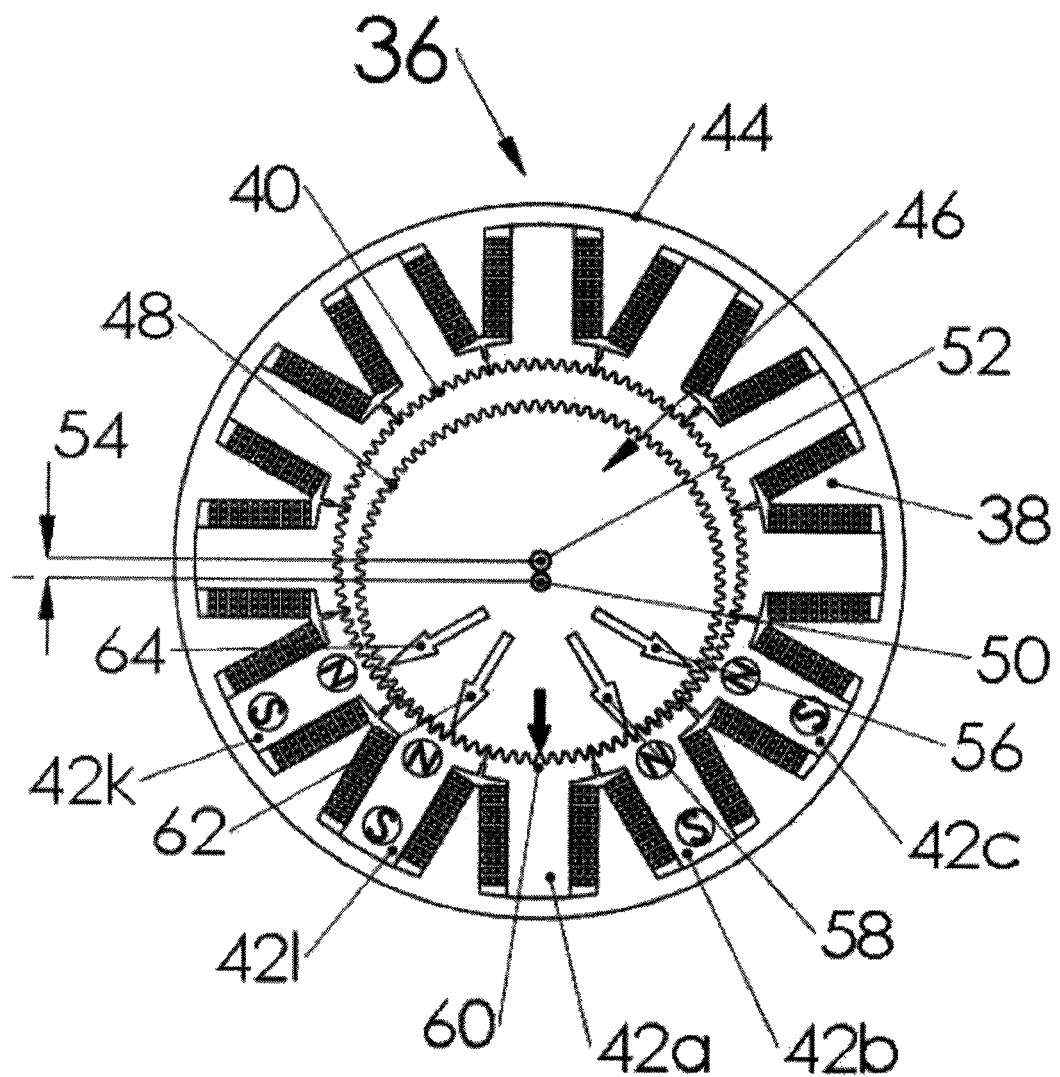
FIG. 2B illustrates, in another view, the operation of the PPPEM of FIG. 2A in accordance with the principles of the present invention.

FIG. 2B shows a sectional, axial view, illustrating the operation of the PPPEM of FIG. 2A in accordance with the principles of the present invention.

When PPPEM 36 is activated, planetary rotor 46 integral with rotor gear 48 is magnetically pulled toward stator ring-gear 40 and tends to pivot in a rolling motion upon moving contact pivot line 60 (indicated with a small, dark arrow) at electromagnet 42a (electromagnets 42k and 42l are not involved at this stage of operation) in order to generate a rolling motion force upon rotor gear 48. The next sequential and adjacent electromagnet 42b, with its magnetic poles facing planetary rotor 46, is shown marked with N (=North magnetic pole) and is activated to attract and pull planetary rotor 46 and integral rotor gear 48 so that planetary rotor 46 continues its planetary rolling motion. Electromagnet 42c now assumes greater control of the rolling motion of planetary rotor 46 due to the growing proximity to rotor gear 48 which now rolls away from one pivot contact line 60 to the next one (arrow 58), and so on in a continuous rolling motion to produce a high torque force sufficient to drive an output shaft (not shown) of PPPEM 36.

In another mode of operation, planetary rotor 46 may be kept in a balanced, steady state. Referring again to FIG. 2B, when PPPEM 36 is operated, magnetic forces (indicated by N-S magnetic poles) from electromagnets 42k and 42l create moving, potential contact pivot lines 64, 62 (shown by respective arrows), by attracting rotor gear 48 towards them on one side of moving, mesh contact pivot line 60 between rotor gear 48 and stator gear 40. Simultaneously, equal magnetic forces (shown as N-S magnetic poles) from electromagnets 42b and 42c also act on rotor gear 48 to attract it towards moving, potential contact pivot lines 58, 56 (shown by respective arrows) on another side of moving, contact pivot line 60, providing equilibrium between the magnetic forces (shown as N-S magnetic poles) thus maintaining rotor 46 in a balanced steady state for applications requiring sensitive positioning control.

Figure 2C:
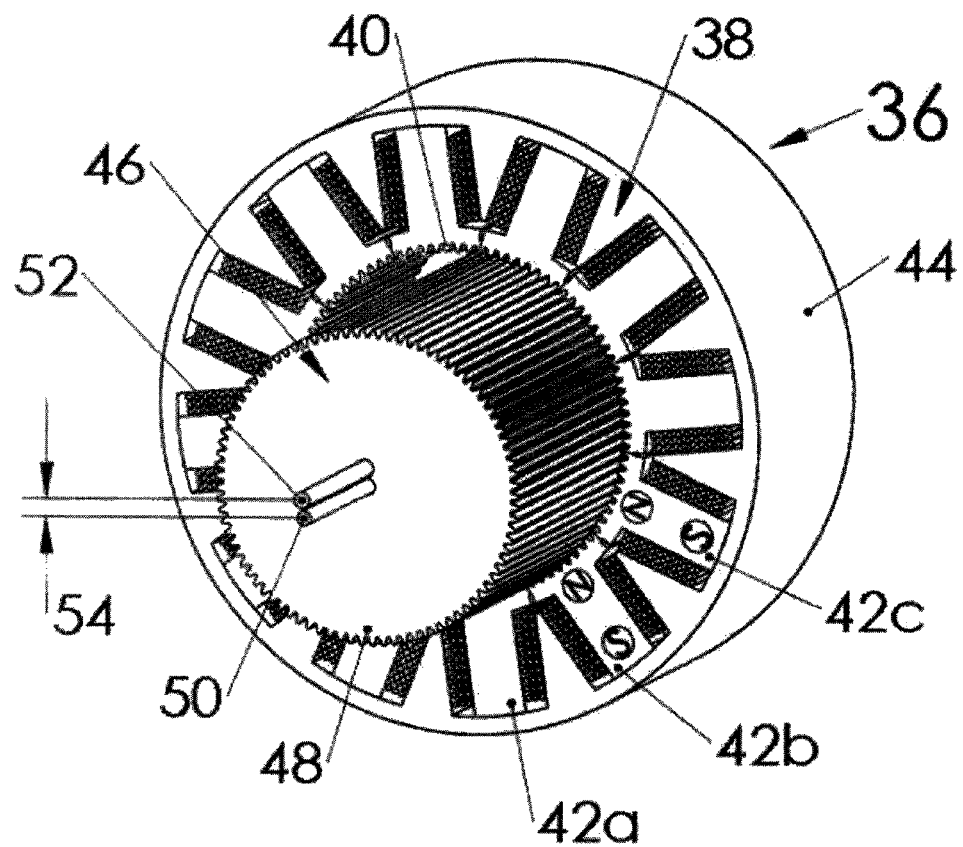
FIG. 2C is an orthographic, partially sectional view of the major components of the PPPEM of FIGS. 2A and 2B.

FIG. 2C is an orthographic, sectional, axial view of the major components of the PPPEM of FIGS. 2A/B showing details of the meshing of planetary rotor gear 48 with the stator gear 40 due to the action of a series of electromagnets 42a/b/c . . . k/l radially mounted around ring stator 38. When electromagnets 42b and 42c are activated together, planetary rotor 46 is impelled to revolve clockwise towards the pull of magnetic forces (indicated by N-S magnetic poles) and away from electromagnet 42a which has been deactivated. Rotor gear 48 moves in planetary mesh upon stator gear 40 (as hereinbefore described) at a single stage ratio of about 1:10.

Figure 3:
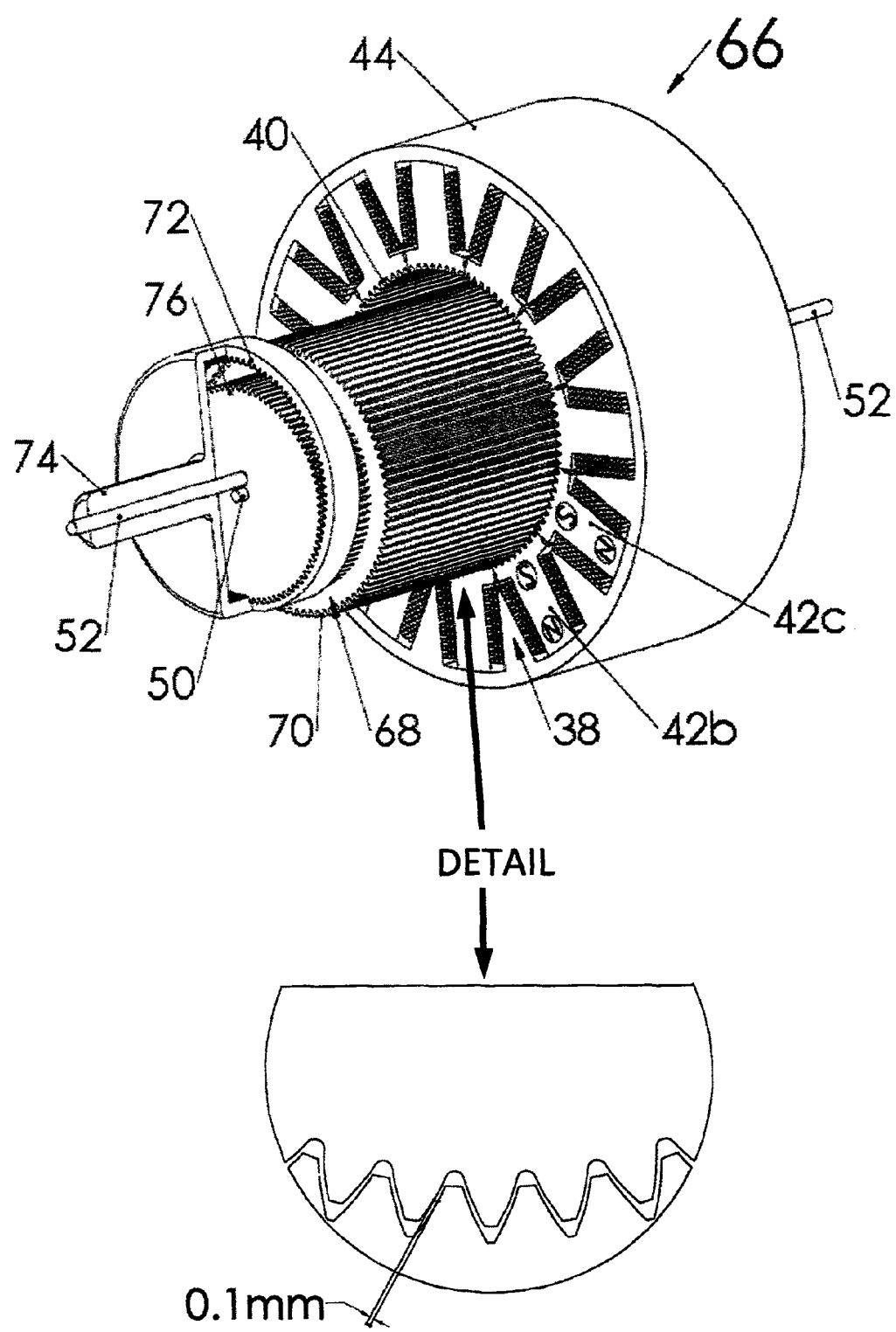
FIG. 3 is an orthographic, partially cut-away view of an embodiment of the present invention which provides a high gear-reduction ratio.

FIG. 3 is an orthographic, partially cut-away view of yet another embodiment of the present invention, comprising a PPPEM having an externally mounted ring stator; a two-step, internally mounted, planetary rotor with integral primary and secondary step gears; and a gear ring integrally formed with an output shaft and providing a high gear-reduction ratio.

PPPEM 66 comprises an externally mounted ring stator 38 housed in an envelope 44, a series of electromagnets 42b/c arranged axially about ring stator 38 with integral stator gear 40. A two-step planetary rotor 68, whose secondary step-gear 76 is integrally formed with the larger, planetary rotor gear 70, is rotatable coaxially along rotor axis 50.

This two-step-gear arrangement compensates for eccentricity by returning final rotational power output through the coaxial stator axis 52 of ring stator 38 and output shaft 74, rather than through the eccentric rotor axis 50. Since output shaft gear-ring 72, integrally formed with output shaft 74, directly meshes with secondary step-gear 76, there is provided a high gear-ratio on the order, for example, of 1:150.

Figure 4:
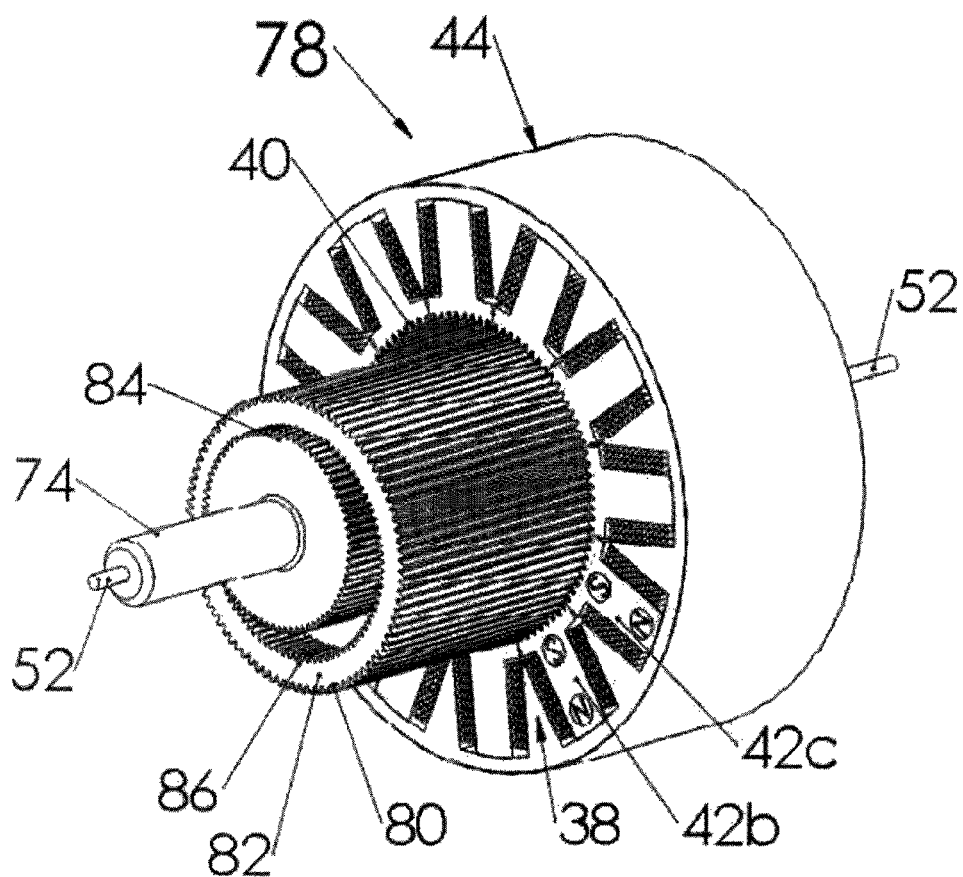
FIG. 4 is an orthographic, partially cut-away view of another embodiment of the present invention which exhibits a low gear-reduction ratio.

FIG. 4 is an orthographic view of another embodiment of the present invention. PPPEM 78 comprises an externally mounted ring stator 38 provided with a series of electromagnets, such as 42b/c, arranged axially, and an integral stator gear 40 about which a primary planetary rotor gear 80 from rotor ring 82 revolves when PPPEM 78 is operated. Simultaneously, a planetary, output-shaft gear 84, which is integral to output shaft 74, meshes with a secondary step-gear 86 to provide rotational motion to output shaft 74 at a given ratio. Note that stator axis 52 is coaxial with the axis of output shaft 74 for direct power transfer.

Figure 5:
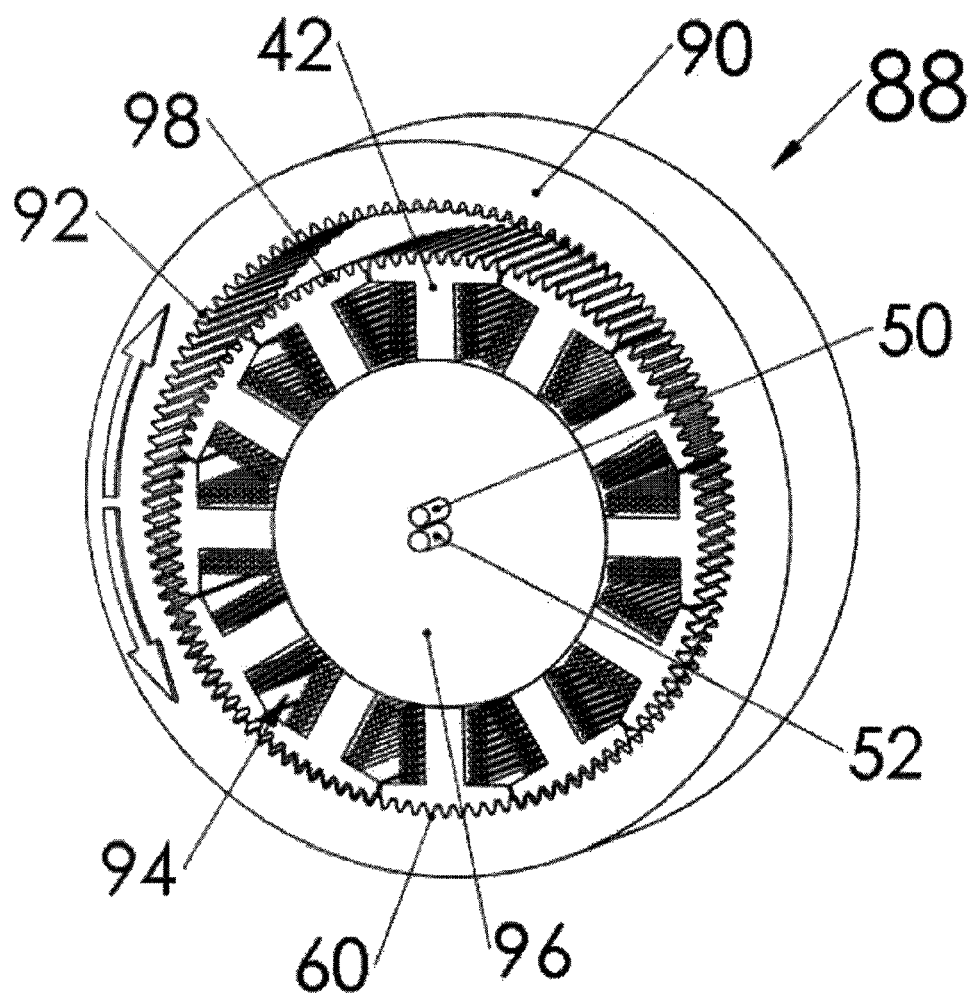
FIG. 5 is an orthographic, partially sectional view of an alternate embodiment of the present invention wherein the PPPEM comprises an external, eccentrically mounted rotor ring-gear that meshes with an internal stator gear.

FIG. 5 is a general orthographic view of an alternate embodiment of the present invention wherein the PPPEM comprises an external, planetary rotor ring integral to a rotor gear, which meshes with an internally disposed stator integral to a stator gear.

PPPEM 88 in FIG. 5 is provided with an externally disposed, planetary ring rotor 90 integral to a rotor gear 92 eccentrically rotatable about a stator axis 52 of stator 94. Stator 94 comprises a series of electromagnets 42 arranged axially around stator core 96. When PPPEM 88 is operated, electromagnets 42, which are angularly located at about 90 degrees to pivot contact line 60, impel planetary rotor gear 92 to mesh with stator gear 98 upon a temporary, moving, mesh pivot line 60 and to rotate about stator 94 at eccentric rotor axis 50 in accordance with the principles of the present invention. Output power is delivered through an output shaft (not shown) connected to a stator shaft (not shown), both of which are in alignment with stator axis 52.

Figure 6:
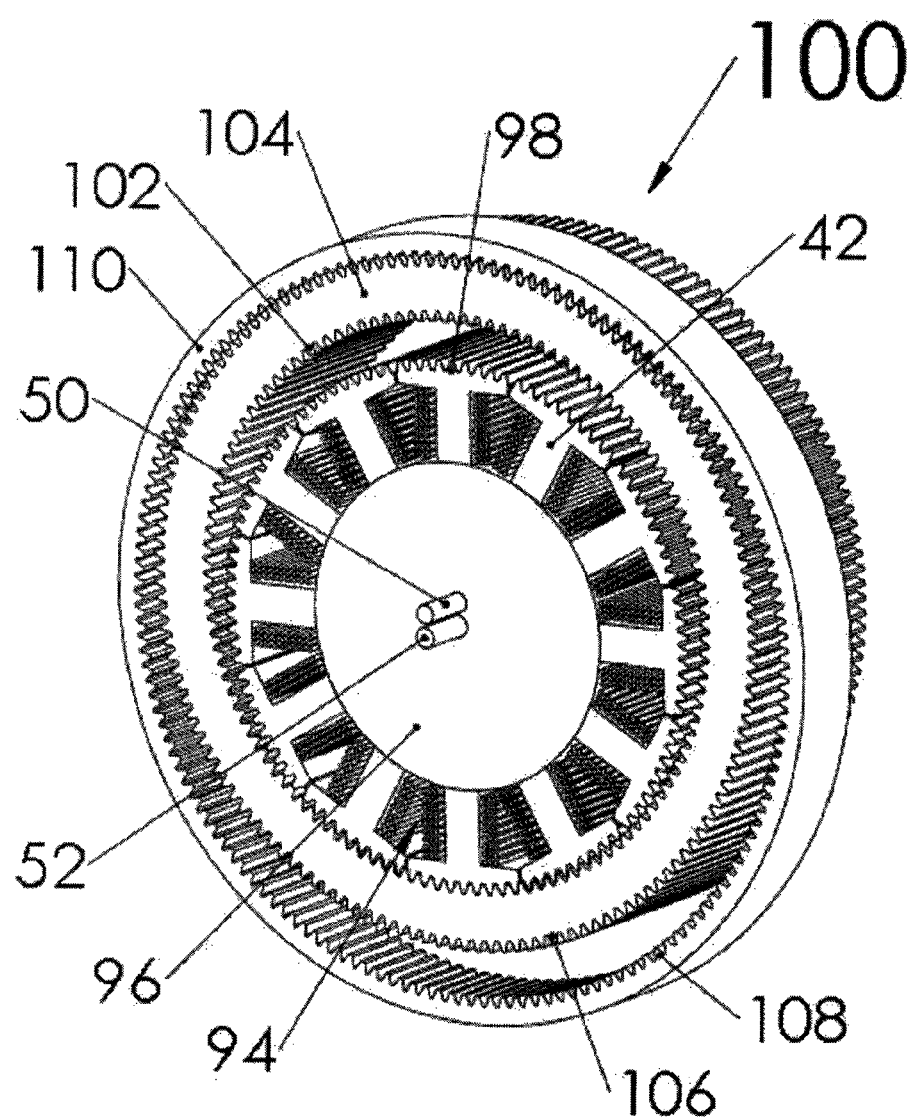
FIG. 6 is an orthographic, partially sectional view of yet another embodiment of the present invention.

FIG. 6 is a general orthographic view of another embodiment of the present invention. PPPEM 100 comprises an internally mounted, centrally disposed stator 94 having a core 96 and provided with a gear 98 to mesh with a first inner gear 102 of a middle-positioned planetary rotor ring 104 whose axis 50 is eccentric to stator axis 52. Rotor ring 104 is provided with a second outer gear 106 which simultaneously engages and meshes with an output-ring gear 108 of an externally mounted, output ring 110 whose axis (not shown) is concentric with stator axis 52 so as to return the eccentric rotational force to directly impel a drive shaft (not shown) when PPPEM 100 is operated in accordance with the principles of the present invention.

Figure 7A:
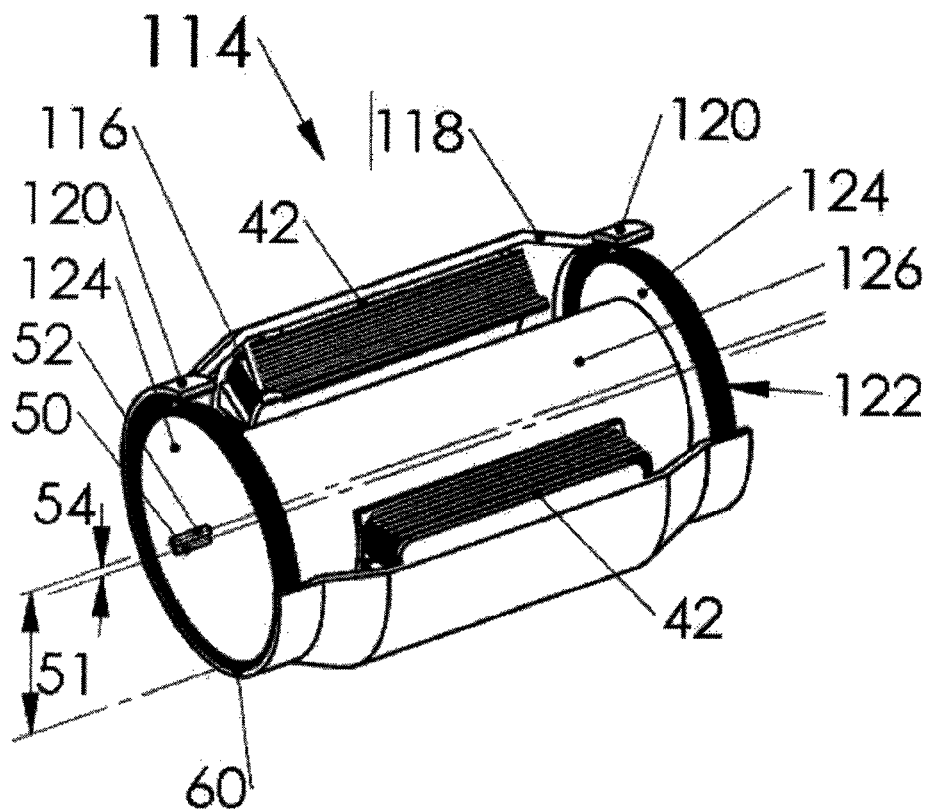
FIG. 7A is a partially cut-away orthographic view of an alternate embodiment of the present invention showing a PPPEM whose externally mounted stator is provided with a ring-gear larger in diameter than that of an internally mounted, cylindrical rotor core coaxially fitted to a pair of oversized rotor gears which mesh with the stator gear.

FIG. 7A is a partially cut-away orthographic view of an alternate embodiment of the present invention.

PPPEM 114 of FIG. 7A/B comprises a relatively large diameter, oversized, externally mounted stator 116 within stator envelope 118 and provided with a pair of stator ring-gears 120. Integrally formed around supporting, round flanges 124 are a pair of internal, oversized, relatively large diameter planetary rotor ring-gears 122. Rotor ring-gears 122 have a diameter relatively greater than the diameter of rotor core 126.

A series of electromagnets 42 are arranged radially around stator 116 to impart continuous rolling motion to planetary rotor 126 and rotor ring-gear 122 when PPPEM 114 is operated. Rotor axis 50 is eccentric to stator axis 52 as indicated by the offset gap 54.

It should be noted that a rotor planetary gear, with respect to consideration of either moments, speed, or diameter-to-thickness ratio, could also have a planetary mesh smaller than that of its rotor and operable in conjunction with a suitable, smaller-sized stator ring-gear.

Figure 7B:
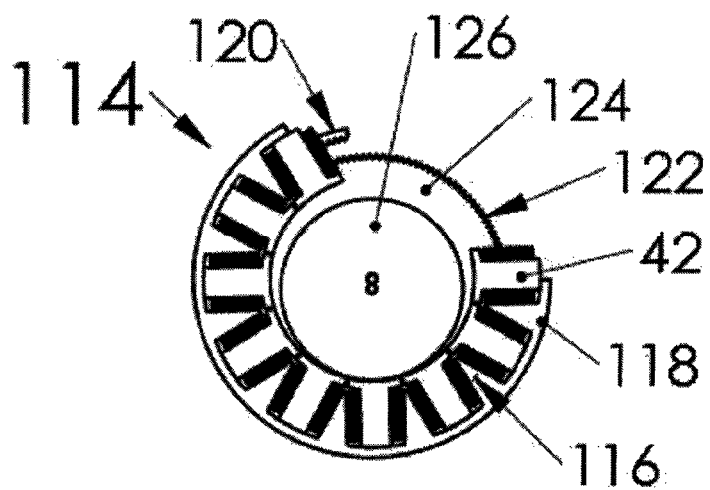
FIG. 7B is a sectional, axial view of the PPPEM of FIG. 7A showing the arrangement of radially mounted electromagnets.

FIG. 7B is a sectional, partly cut-away, axial view of the PPPEM 114 of FIG. 7A showing the arrangement in axial profile of the series of radially mounted electromagnets 42.

Stator ring-gear 120 is shown oversized by way of example only, since a stator ring-gear can also have a diameter smaller than the diameter of a rotor gear with which it meshes, as explained in the previous paragraph.

Figure 8A:
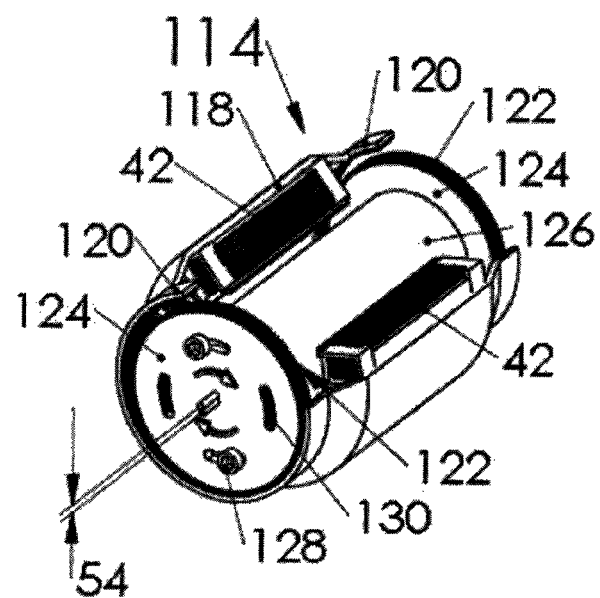
FIG. 8A is an orthographic, partially cut-away view of the PPPEM of FIG. 7A shown together, by way of convenience only, with two types of anti-backlash mechanisms (as detailed in FIGS. 8B and 8C).

FIG. 8A is an orthographic, cut-away view of the PPPEM 114 of FIG. 7 shown, by way of convenience only, provided with two, alternate types of anti-backlash mechanisms (as detailed in FIGS. 8B and 8C) in accordance with another embodiment of the present invention. PPPEM 114 is provided with at least a pair of an anti-backlash mechanisms 128, 130 which are disposed around the axis of rotor flange 124 on the exterior faces thereof. One type of anti-backlash mechanism comprises a pair of adjustable screws 128. Alternatively, another type of anti-backlash mechanism is a pair of curved compression springs 130. In actual practice only at least one pair of either mechanism 128 or 130 would be used to control or eliminate planetary mesh backlash.

Figures 8B, 8C:
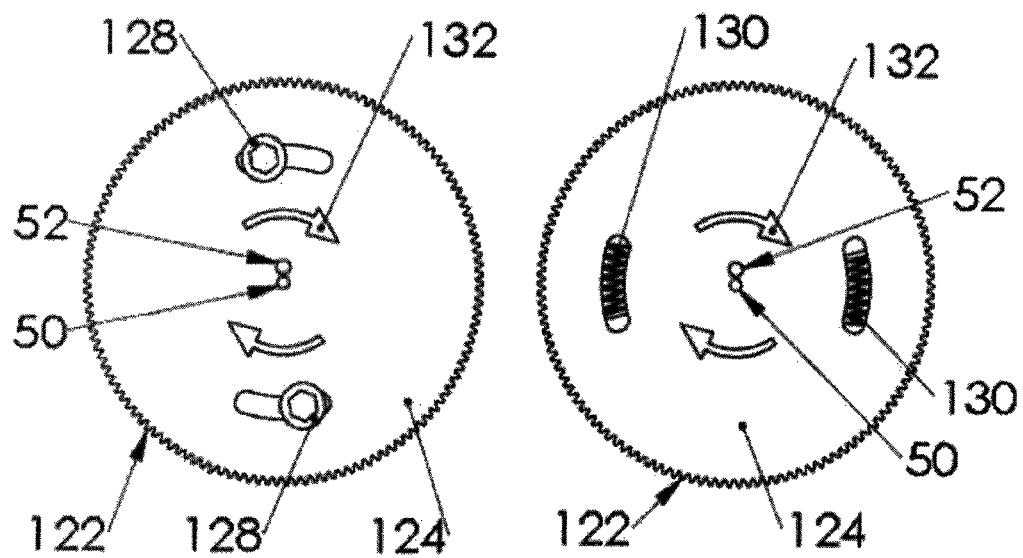
FIG. 8B illustrates the adjustable screw anti-backlash feature of FIG. 8A.
FIG. 8C illustrates the adjustable spring-type anti-backlash of FIG. 8A.

FIG. 8B is an axial view of the rotor flanges 124 with rotor gear 122 of FIG. 8A showing the disposition of the first type of anti-backlash mechanism in accordance with the principles of the present invention. Compression screws 128 are adjustable within respective curved slots which are oriented parallel to the circumference of flanges 124 and equidistant from rotor axis 50. Anti-backlash mechanisms are paired for balance when rotated, for example, clockwise in the direction of the curved arrows 132, when impelled by a PPPEM (not shown).

FIG. 8C is an axial view of the rotor of FIG. 8A showing the disposition of the second type of anti-backlash mechanism in accordance with the principles of the present invention. A pair of compression springs 130 is accommodated axially within their respective, curved recesses of rotor flange 124. The pair of anti-backlash springs 130—as well as the pair of adjustable screws 128—are balanced on rotor flanges 124 by being positioned at equal distances and on opposite sides from rotor axis 50 so as to eliminate planetary mesh backlash when rotor gear 122 is operated.

Figure 9A:
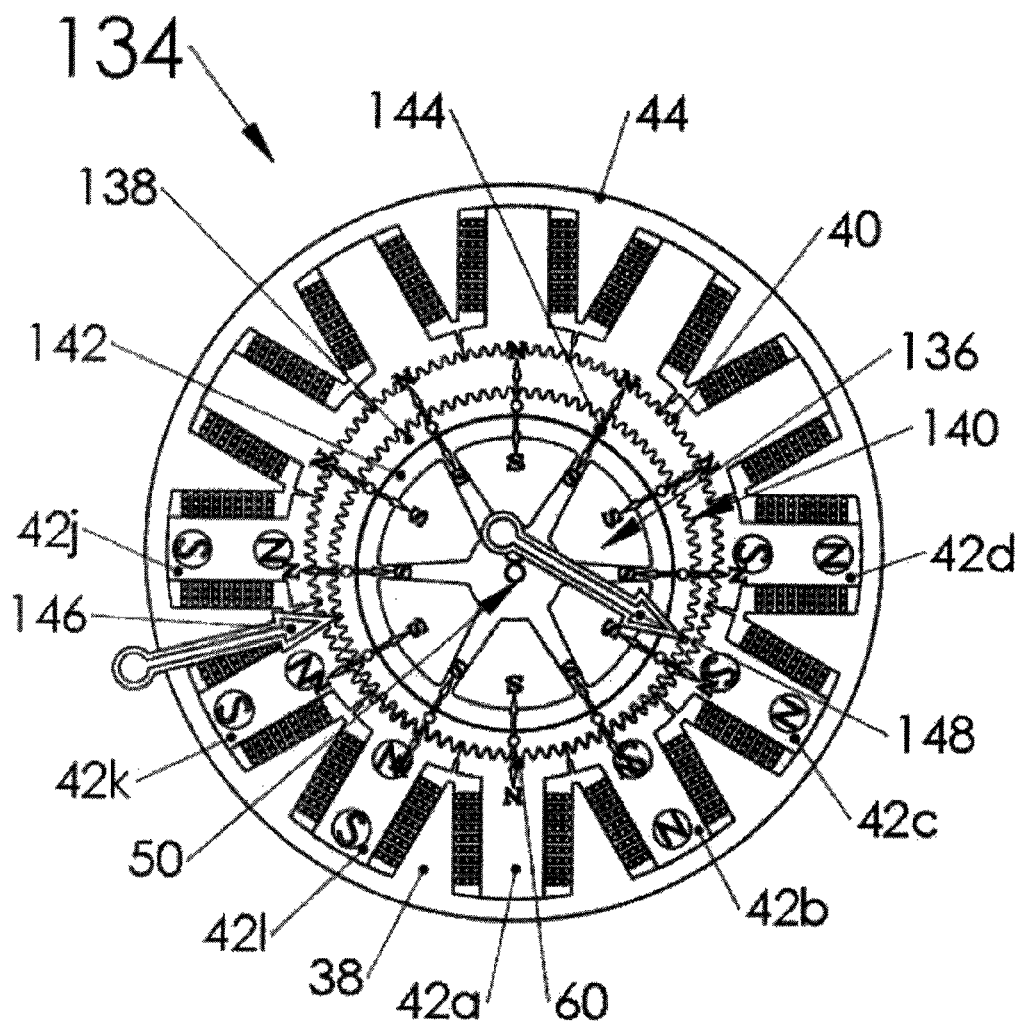
FIG. 9A is a sectional view of a PPPEM provided with tubular, radial magnet-rings in accordance with still another embodiment of the present invention.

FIG. 9A is a sectional view of a PPPEM provided with tubular, radial magnet-rings in accordance with still another embodiment of the present invention.

PPPEM 134 is provided with an externally mounted ring stator 38 containing a series of radially mounted electromagnets 42a/b/c . . . j/k/l and integral to a stator gear 40, all enclosed within a housing envelope 44.

In FIGS. 9A/B, an internal, eccentrically mounted planetary rotor 136 of PPPEM 134 is shown which comprises a rotor gear 140 integral with a magnetic rotor-ring 138 seated on a rotor core 142. Rotor gear 140 meshes with stator gear 40 (see FIG. 9A) and rotates about eccentric rotor axis 50 when PPPEM 134 is operated. Tubular, radial magnets 144 which are part of rotor core 142 attached to planetary rotor 136 and concentric with rotor axis 50. Note that magnetic North poles (N) are oriented so as to point radially outward and South poles (S) are consequently pointing towards rotor axis 50.

When stator electromagnets 42j, 42k, and 42l are turned on, their North (N) poles point towards stator axis 52 at the same time that tubular, radial magnets 144 are oriented such that a North (N) magnetic polarity causes repulsion between the like magnetic poles to those of stator electromagnets 42j, 42k, and 42l. Thus push forces 146 (arrow) are generated which push planetary rotor 136 to pivot upon moving, pivot contact line 60 and planetary rotor gear 140 meshes with stator ring-gear 40.

Simultaneously, stator electromagnets 42b, 42c, and 42d, when turned on with their South (5) magnetic poles pointing to the opposite, North (N) magnetic polarity of tubular, radial magnets 144 cause a magnetic attraction. A magnetic pull force 148 is exerted on planetary rotor gear 140 which is integral to planetary rotor 136. Consequently planetary rotor 136 is impelled by push-pull magnetic forces 146, 148, respectively, to rotate in a continuous, rolling motion which advances planetary rotor 136 from moving, pivot contact line 60 to other temporary mesh contact positions around stator gear 40.

Figure 9B:
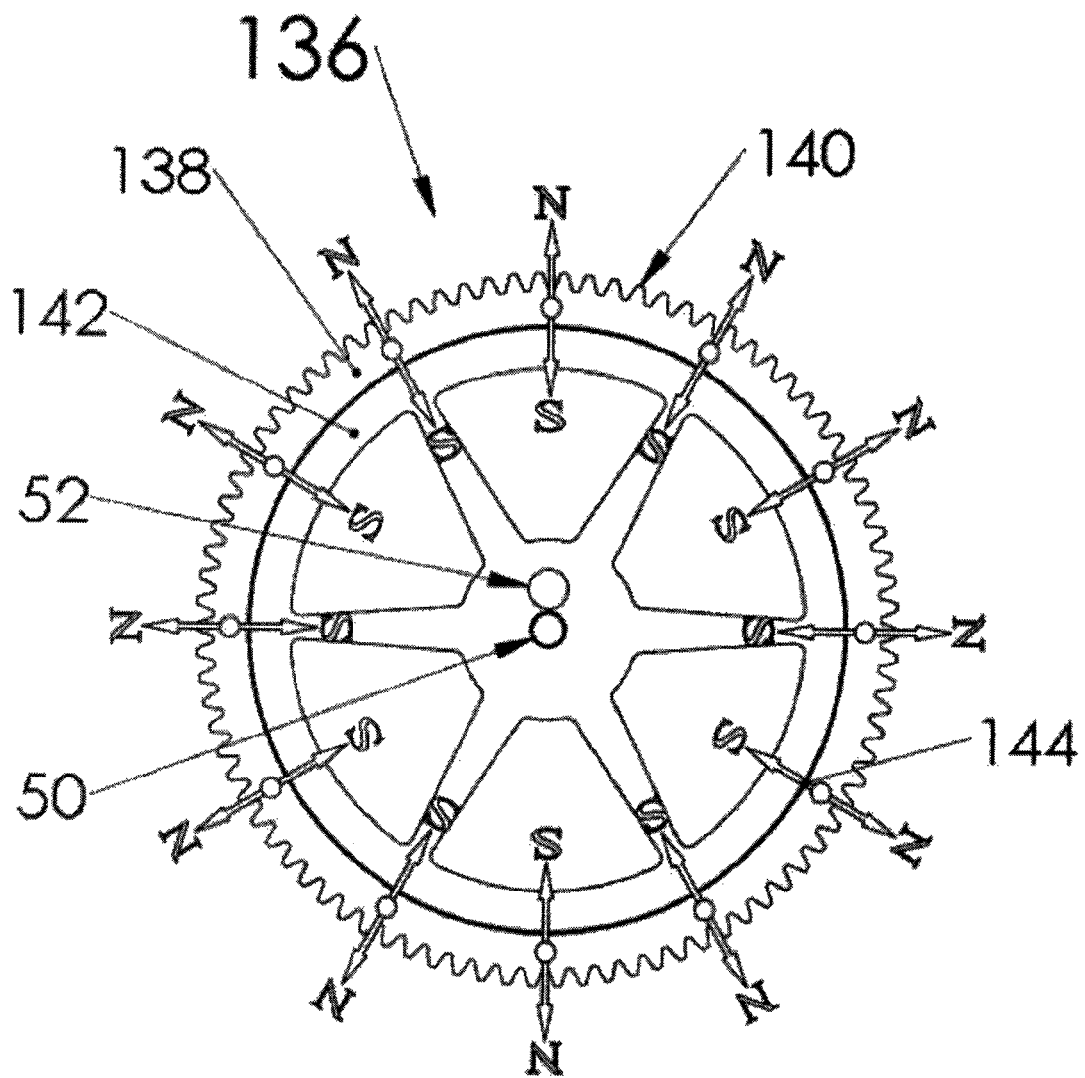
FIG. 9B is a sectional, detailed view of the internal rotor of FIG. 9A showing the tubular, radial magnet-rings.

FIG. 9B is a detailed sectional view of planetary rotor 136 of FIG. 9A showing the tubular, radial magnets 144 integral to rotor case 142 and the orientation of the S and N magnetic poles as explained above with respect to FIG. 9A. Tubular, radial magnets 144 are built into rotor case 142 as a one-piece unit with given magnetic poles configured around the outer edge of rotor case 142. All like magnetic poles are inwardly or outwardly oriented as needed for various applications.

Figure 9C:
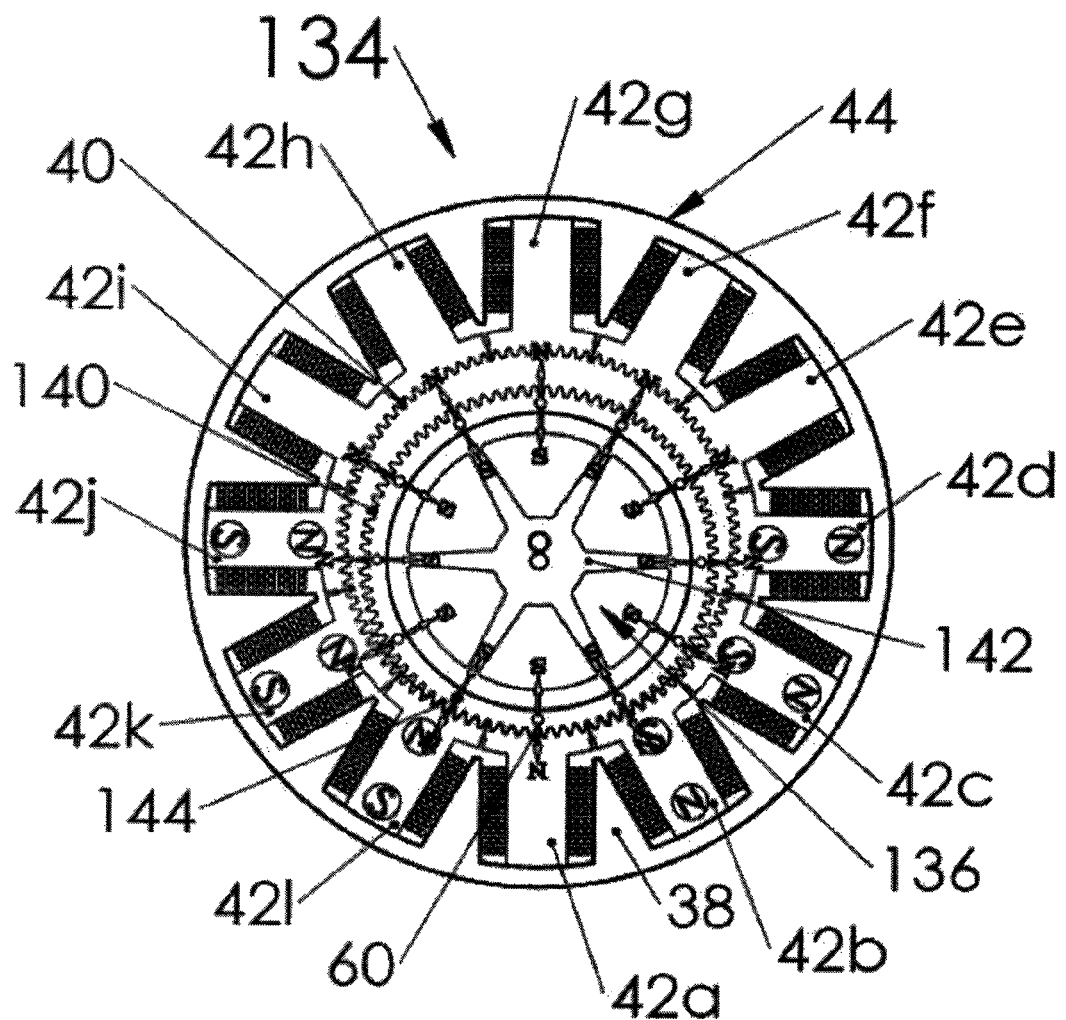
FIG. 9C is a sectional view of the PPPEM of FIGS. 9A/B showing an exemplary manner of operation of magnetic forces to drive the rotation of an internally mounted, planetary rotor in accordance with the principles of the present invention.

FIG. 9C is a sectional view of the planetary push-pull motor of FIGS. 9A/B showing the exemplary manner of operation of magnetic forces for driving the rotation of an internally mounted planetary rotor in accordance with the principles of the present invention.

A series of stator electromagnets 42 a-l, in a preferred embodiment of the present invention, can be activated in any sequence. For example, stator electromagnets 42b, 42c, and 42d are shown activated in FIG. 9C with their North poles (N) directed radially outward. Simultaneously, stator electromagnets 42j, 42k, and 42l are activated with their North poles (N) directed radially inward. This combination of magnetic forces (indicated by magnetic poles marked N or S) impels rotor 136 to pivot clockwise about the moving, contact pivot line 60 where rotor gear 140 and stator gear 40, temporarily come into balanced mesh contact with one another until actuation of the aforementioned electromagnets 42.

Similarly, a counterclockwise rotation of rotor 136 can be made utilizing these same six electromagnets, where 42j is off, 42k, 42l are live with their North poles (N) directed radially outward, while simultaneously 42b, 42c, and 42d are activated with their North poles (N) directed radially inward.

Other combinations and sequences of activation of the stator electromagnets 42, wherein even numbers of them can simultaneously be made live, will provide different angles between activated magnetic poles to pivot planetary rotor 136 one way or another about any desired pivot contact line, such as moving contact pivot line 60, as may be required in various applications of PPPEM 134.

Figure 9D:
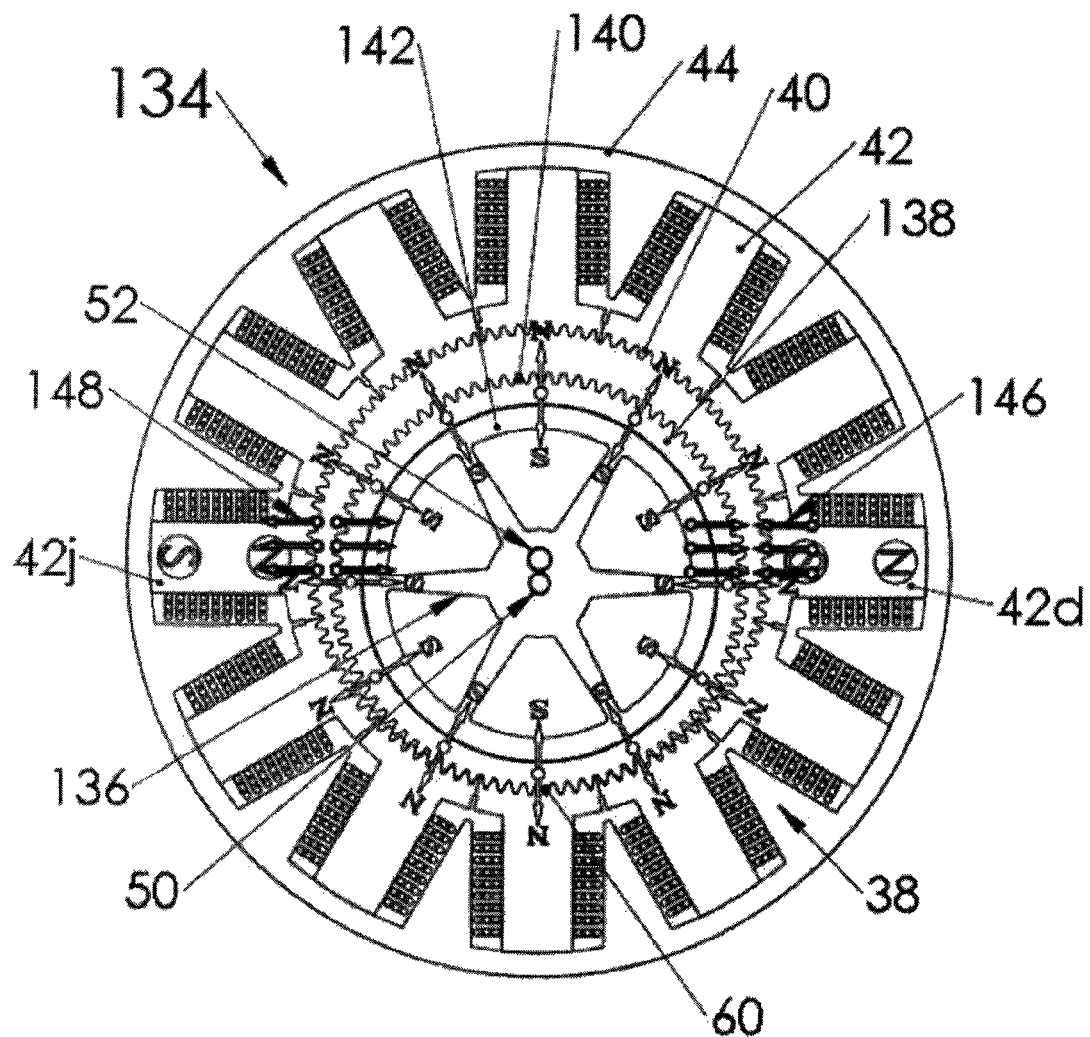
FIG. 9D is a sectional view of the PPPEM of FIGS. 9A/B/C showing radial magnetic forces in operation in accordance with the principles of the present invention.

FIG. 9D is a sectional view of the PPPEM of FIGS. 9A/B/C showing radial magnetic forces in operation in accordance with the principles of the invention.

Unlike conventional, prior art electric motors where the rotational vector approaches the tangential rotating force in relation to a rotor, and the rotor axis is coaxial with the stator axis, in the PPPEM 134 illustrated in FIG. 9D of the present invention, the magnetic pull forces 146 and push forces 148 (respective series of arrows) between planetary rotor 136 and stator 38 are radial and produce a push-pull effect where the axis of rotation is not the rotor axis 50 (shown on end as a point), but the tangent to the line of contact, i.e., the moving, mesh contact pivot line 60 (shown as a point) between stator gear 40 and rotor gear 140.

Figure 10:
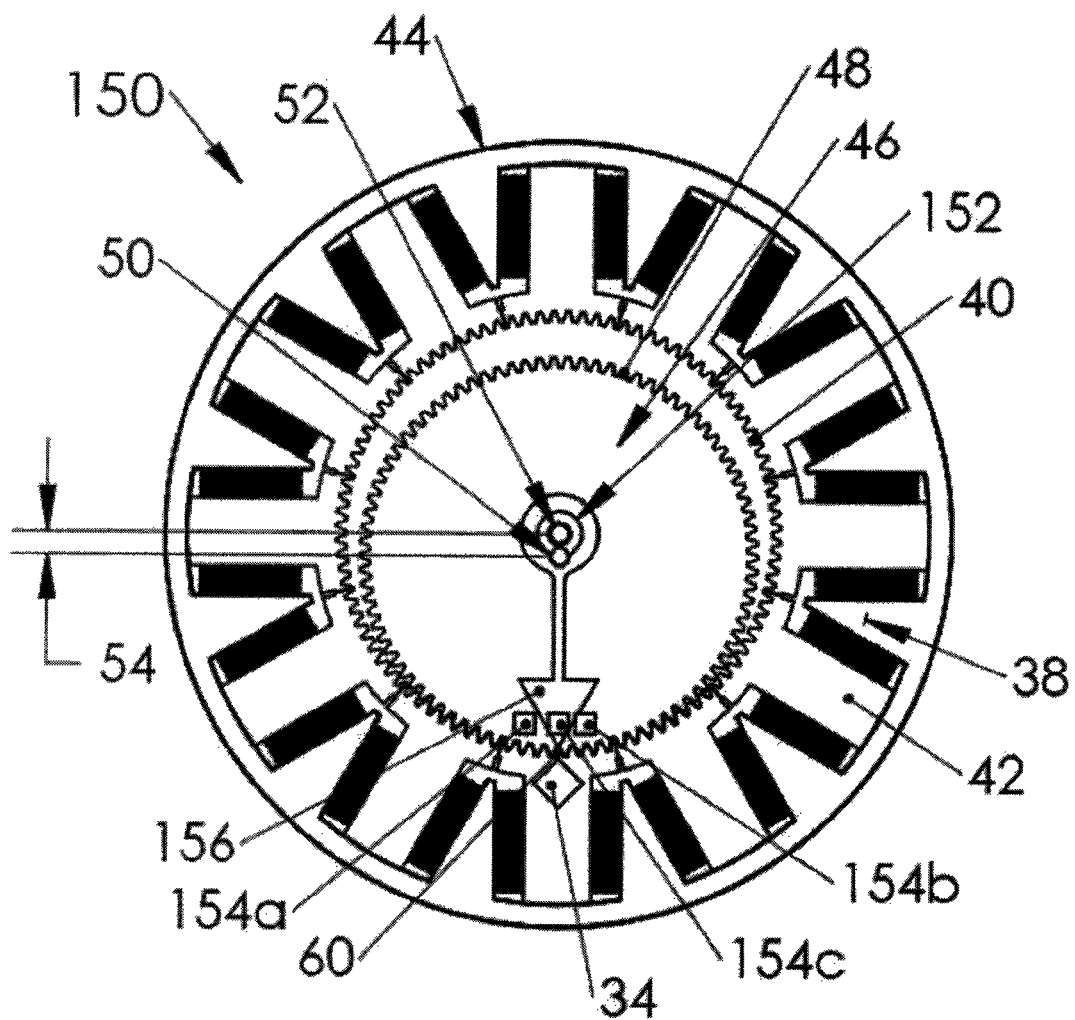
FIG. 10 is a sectional view of a PPPEM, provided, by way of example, with a mechanism for detecting and measuring planetary rotor speed and direction of rotation, cam shaftto-stator relative position, and rotor-to-stator orientation in accordance with the principles of the present invention.

FIG. 10 is a sectional view of an example of a PPPEM provided with a mechanism for detecting and measuring rotor speed and direction of rotation, cam shaft-to-stator relative location, and rotor-to-stator orientation to a pivot contact line in a specified location, in accordance with the principles of the present invention.

PPPEM 150 of FIG. 10 comprises an external ring stator 38 and stator gear 40 within a stator casing 44, and an eccentric planetary rotor 46 integral to rotor gear 48. A cam shaft indicator 156 (hereinafter "indicator", represented by a large, downward pointing arrow) is rotationally attached to cam shaft 152 coaxial with stator axis 52 and set so as to initially point in the direction of mesh contact point 60 between stator 38 and rotor 46. Cam shaft 152 can rotate, for example, about 24 revolutions during the same period of time that planetary rotor 46 rotates only one revolution, therefore it is possible to accurately detect and measure rotor speed and/or direction of rotor rotation and/or rotor relative position to the stator 38 via cam shaft 152 which rotates at a speed multiple to that of planetary rotor 46.

A single Hall Effect sensor 34 is disposed at the external ring stator 38 for measuring the magnetic flux in the system when PPPEM 150 is operated. At least three small magnets 154a-c are positioned on the cam shaft indicator 156 in close proximity to Hall sensor 34. When magnets 154a and 154c are asymmetrically oriented to magnet 154b, it is possible to measure cam shaft speed and direction of rotation, and cam shaft-to-stator absolute orientation and at a high resolution by use of an optical encoder, resolver, photo diode sensor, or any other method as is known to those skilled in the art.

Alternatively, a digital converter (not shown) can be provided to convert the analog data provided by indicator 156 into a convenient digital form for display on a standard monitor screen as known to those skilled in the art.

Figure 11:
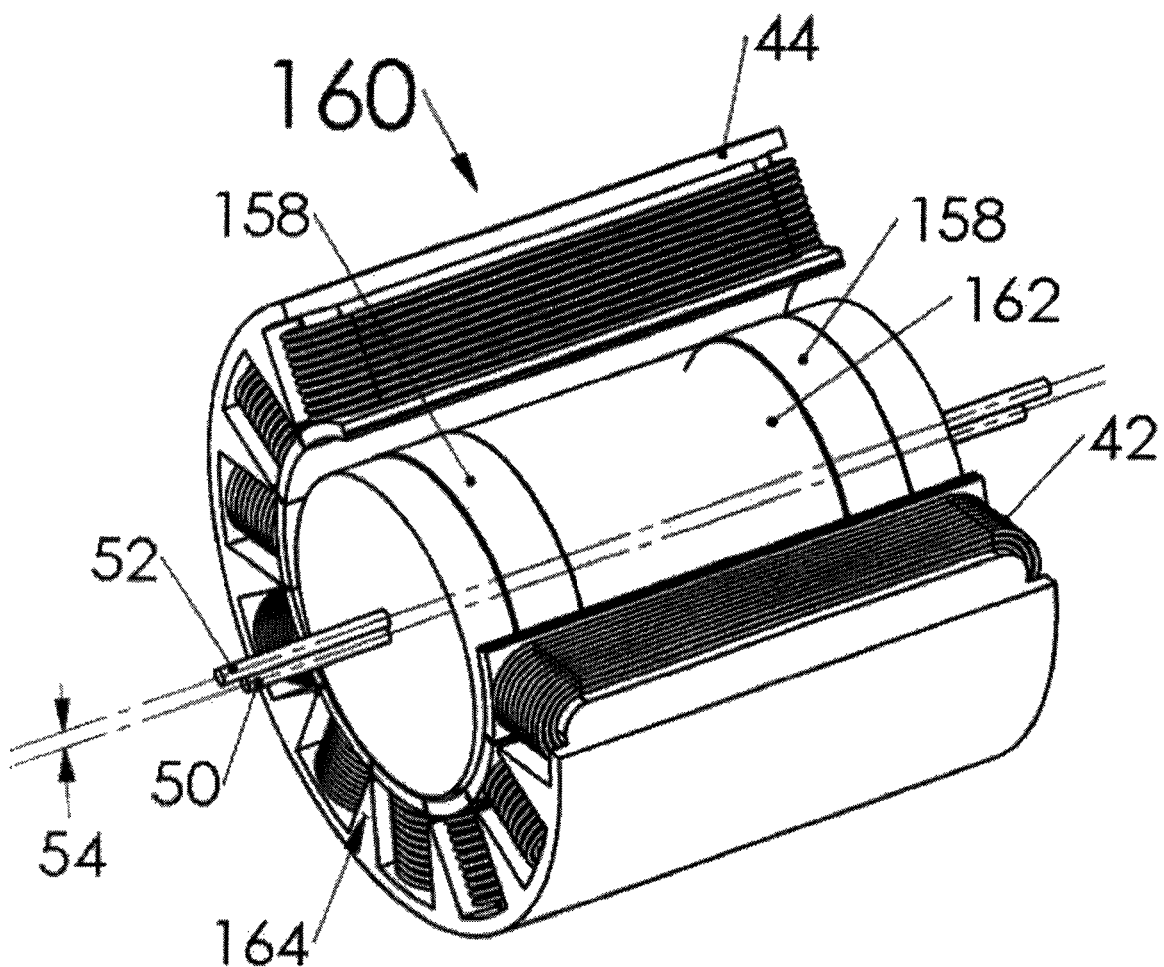
FIG. 11 is an orthographic, partially cut-away view of another embodiment of the present invention showing a PPPEM with an eccentric, gearless, friction rotor.

FIG. 11 is an orthographic, partial cut-away view of another embodiment of the present invention. PPPEM 160 comprises an external, gearless, friction stator 164 and an internally mounted, eccentric, gearless, friction planetary rotor 162.

In this friction-type PPPEM 160, the at least a pair of friction rings 158 can be in a diameter slightly smaller than the stator internal diameter; the rotor-to-stator eccentricity (as indicated by eccentricity gap 54 per FIG. 11), therefore, will be very small. But the magnetic interaction forces will be strong and the cam shaft-to-rotor ratio will consequently be high due to the close proximity between planetary rotor 162 and stator 164.

Rotor 162 rotates eccentrically about axis 50 when PPPEM 160 is operated, being offset from stator axis 52 by a gap 54. Rotor 162 is provided with at least a pair of friction rings 158. This construction increases the rotor-to-stator ratio up to about 1:100.

Stator 164 is provided with a series of electromagnets 42 arranged radially about the stator axis 52 which is coaxial with an output shaft (not shown). Stator 164 is housed in stator casing 44 which also conveniently serves as housing for PPPEM 160.

Figure 12A:
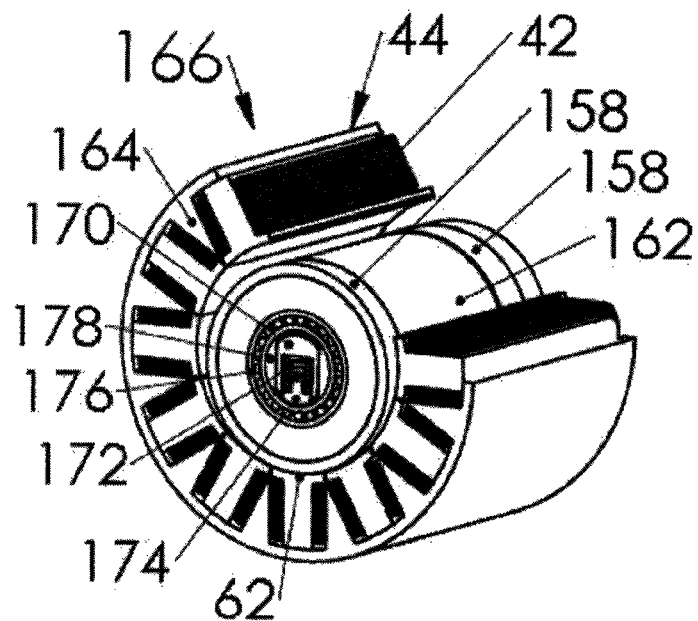
FIG. 12A shows an orthographic, partially cut-away view of a friction PPPEM in another embodiment of the present invention.

FIG. 12A shows an orthographic partial cut-away view of a friction-type PPPEM in yet another embodiment of the present invention. PPPEM 166 comprises an external friction stator 164, which is provided with a series of electromagnets 42 arranged radially about the stator axis (not shown) and which defines the centerline of PPPEM 166. Stator 164 is housed in an envelope 44 which also serves as a convenient housing for PPPEM 166. Planetary friction rotor 162 is provided with at least a pair of friction rings 158 as in PPPEM 160 (see FIG. 11).

An eccentric cam shaft 170 (see details in FIG. 13A) and a tubular bearings element 176 are provided to maintain the eccentricity gap 54 (see FIG. 11) between the axes 50, 52 (see FIG. 11) of planetary friction rotor 162 and stator 164, respectively, and also to reduce friction during the rotation of eccentric cam shaft 170 and planetary friction rotor 162, which are the principal rotating elements when PPPEM 166 is operated. Each of these elements rotate at different speeds according to need, but they are all dynamically balanced.

The eccentric cam shaft 170 has a double-D section profile that slidingly fits with the internal double-D openings at the bearing filler seats 178. This particular mechanism keeps the cam shaft 170 and bearing filler seats 178 at the same orientation but permits a radial movement of rotor 162 toward stator 164 to produce the friction contact needed for the planetary mesh torque transfer.

PPPEM 166 is also provided with at least a pair of axially mounted, radial compression springs 172 preloaded for ensuring positive rotor-to-stator engagement at a predetermined load for the desired friction needed for a specific torque transfer. At least a pair of compression springs 172 are each fitted with matching spring shoe elements 174 housed inside eccentric cam shaft 170 for applying pressure on the planetary friction rotor 162 at the moving mesh contact point 60 (see FIG. 12B) between rotor 162 and stator 164 which varies with the rotation of planetary friction rotor 162. Enclosing compression springs 172 and spring shoe elements 174 are bearing element seats 178 which maintain compression springs 172 oriented radially during rotation of planetary friction rotor 162.

Figure 12B:
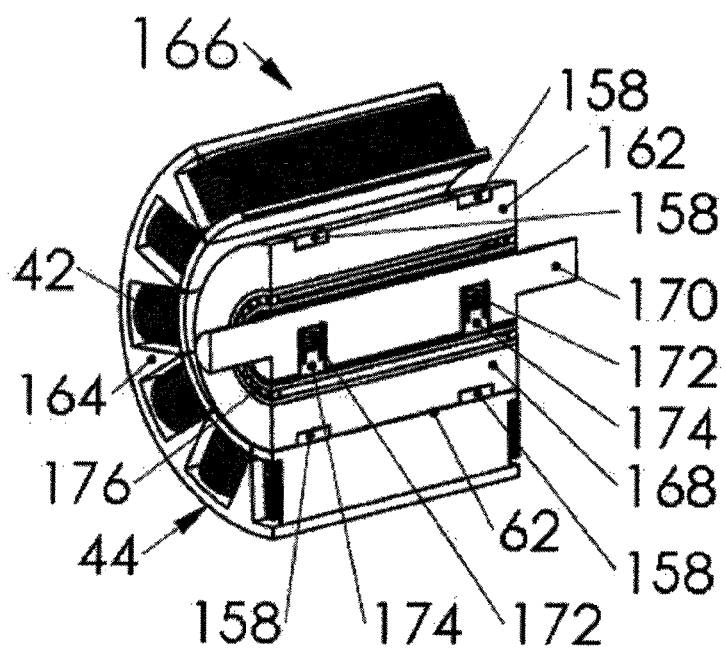
FIG. 12B is an orthographic, sectional view of the motor of FIG. 12A showing details of the planetary rotor construction.

FIG. 12B is an orthographic, partially cut-away, sectional view of the motor of FIG. 12A showing details of the rotor construction. PPPEM 166 is shown provided with two rotating elements: eccentric cam shaft 170 and planetary friction rotor 162 with at least a pair of friction rings 158. Eccentric cam shaft 170 is eccentrically mounted so that planetary friction rotor 162 is offset from stator axis 52 (see FIG. 11) of friction stator 164 at a specified gap 54 (see FIG. 11). Eccentric cam shaft 170 also maintains the centerline of rotation which is defined as rotor axis 50 (see FIG. 11) at a specified offset from stator axis 52 (see FIG. 11). The two rotating elements 170, 162 are free to rotate independently of one another and at different speeds.

Tubular, bearings element 176 is provided to reduce rotational friction between the bearings. A pair of compression springs 172, as in FIG. 12A, is seen in profile here housed within eccentric cam shaft 170. Note the moving, pivot contact line 60 between planetary friction rotor 162 and friction stator 164 which are in contact only indirectly through friction rings 158. Other elements are as described above with relation to FIG. 12A.

Figure 13A:
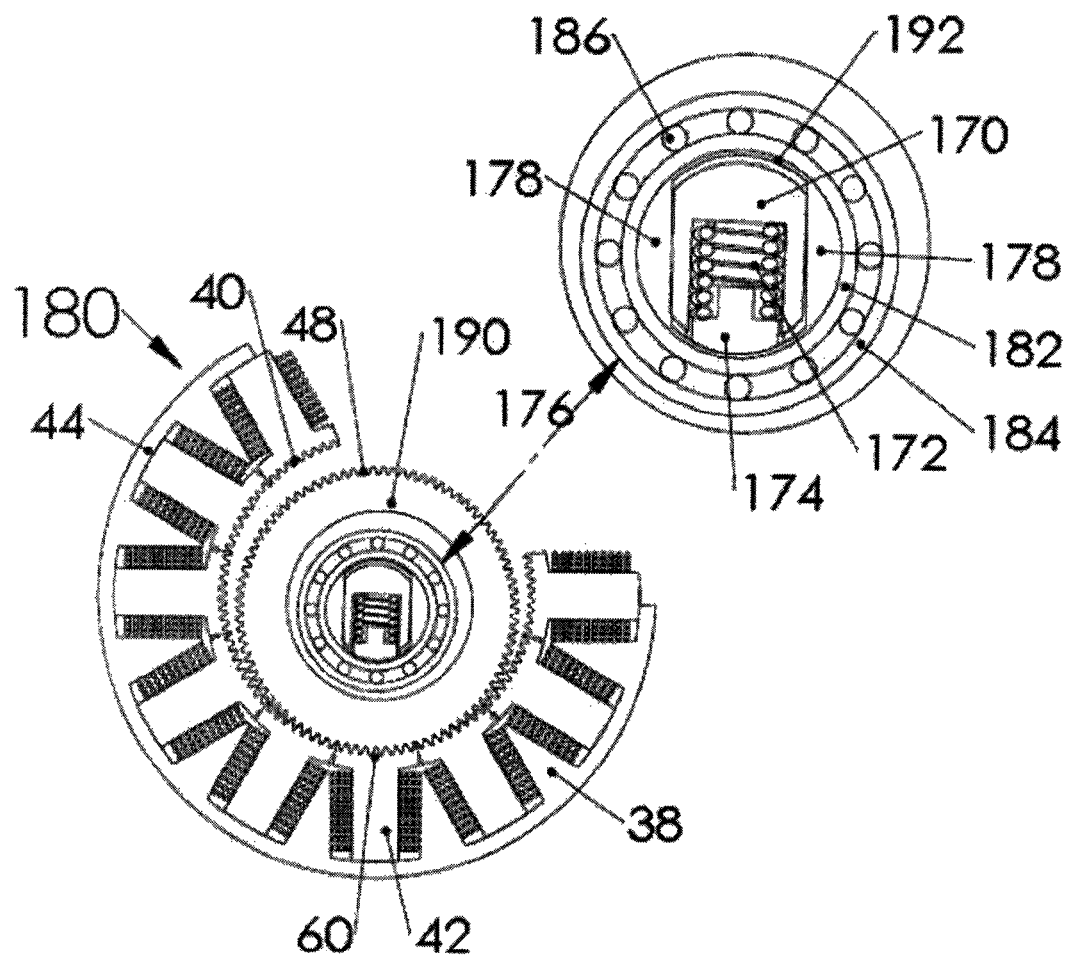
FIG. 13A is a sectional, cut-away view and an enlarged detail view of another embodiment of a PPPEM provided with radial springs and tubular bearings elements to promote zero backlash.

FIG. 13A is a sectional, cut-away view and an enlarged detail view of another embodiment of a PPPEM provided with gears, radial springs and a tubular bearings element to promote zero backlash.

PPPEM 180 of FIG. 13A comprises an externally mounted ring stator 164 integral to an internally oriented stator ring-gear 40 and is provided with a series of electromagnets enclosed in ring stator envelope 44. PPPEM 180 further comprises an internally mounted, soft steel, eccentric planetary rotor 192 integral to planetary rotor gear and a tubular, bearings element 176 centrally mounted within eccentric planetary rotor 192. Moving, mesh, pivot line 60 (shown as a point in this axial view) represents the closest tangential proximity between planetary rotor gear 48 and stator ring-gear 40 as a result of the eccentric relationship between them.

Tubular, bearings element 176 is shown in the detailed enlargement as containing bearings 186 confined between inner and outer walls, 182 and 184, respectively. Eccentric cam shaft 170 is provided with at least one pair of compression springs 172 each mounted on an inverted, T-shaped, spring shoe element 174 which is kept in place by a retainer filler seat 178.

The pair of spring shoe elements 174 is oriented in such a way within the confines of cam shaft 170 and bearings filler seats 178 so as to exert a radial pushing force towards the inner bearings housing 182 by force of a pair of compression springs 172. A small clearance gap 196 is provided for radial expansion of compression springs 172 which apply a positive force at any mesh pivot line along the path of planetary motion taken by planetary rotor 192, such as, for example, mesh pivot line 60 on planetary rotor gear 48.

The downward, radial expansion movement of the pair of compression springs 172 and resultant movement of spring shoe elements 174 promote zero backlash when planetary rotor gear 48, for example, fully meshes with stator ring-gear 40 at a typical mesh pivot line 60 upon operation of PPPEM 180.

Figure 13B:
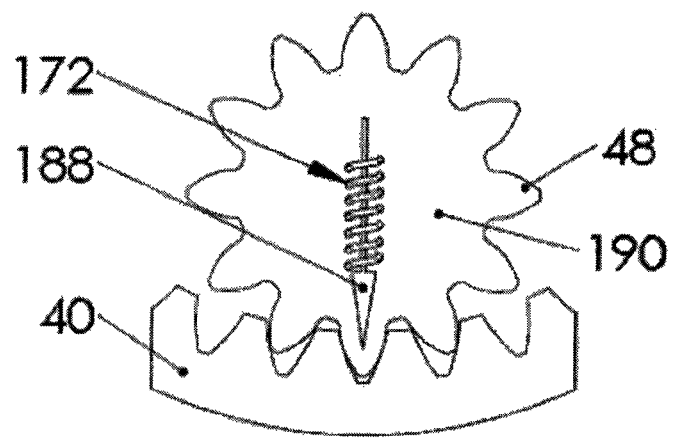
FIG. 13B is a detail view of the action of a typical, radial compression spring in aiding positive meshing between the gear teeth of a rotor gear and the stator ring-gear as shown in FIG. 13A.

FIG. 13B is a magnified schematic view of one of the pair of typical radial compression springs 172 (see FIG. 13A). Compression spring 172 is free to move, together with planetary rotor 192 towards stator gear 40 to eliminate possible backlash caused by gear meshing between gears 40, 48 when they engage and mesh.

Figure 14:
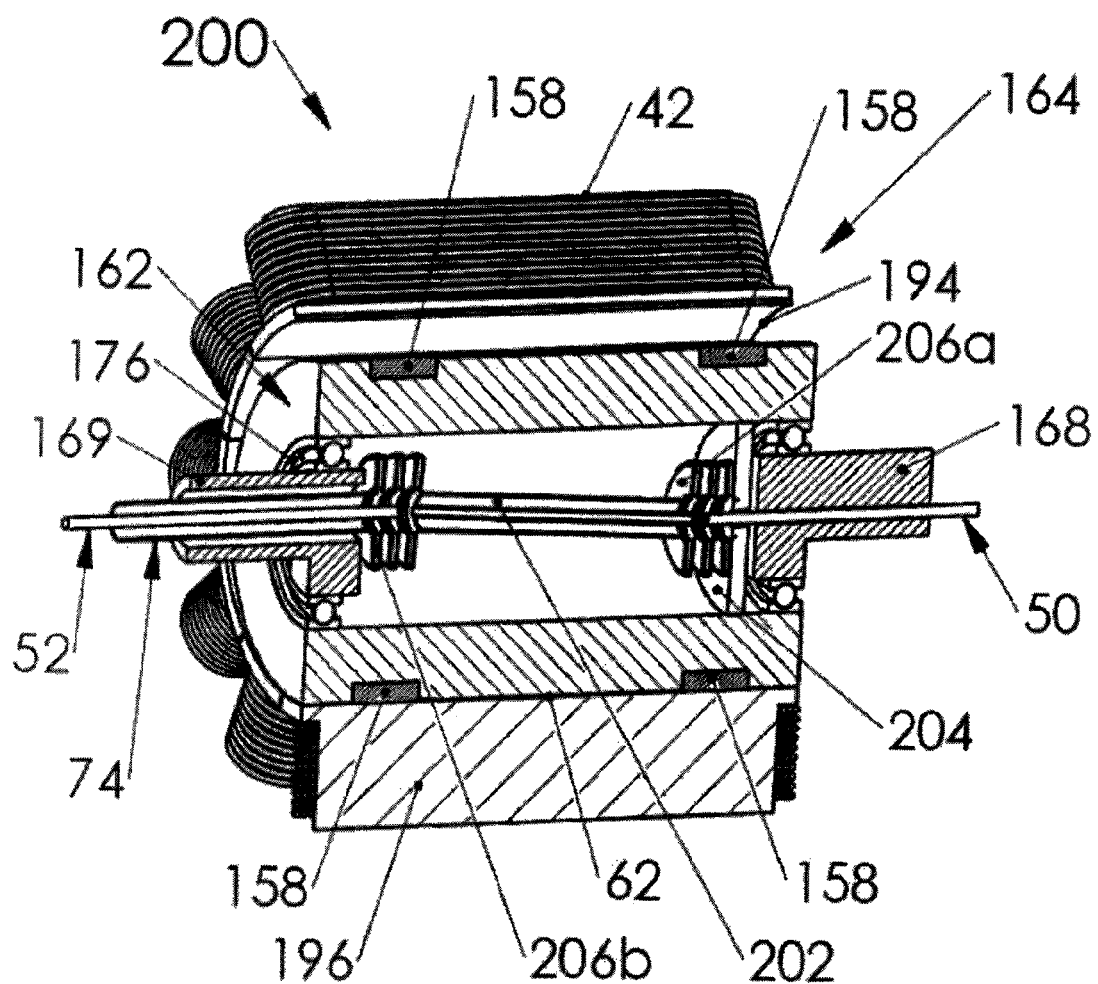
FIG. 14 is an orthographic, sectional view of a PPPEM, in another embodiment of the present invention, which utilizes a planetary rotor having flexible couplings to realign the eccentric rotor output shaft to be coaxial with the stator axis for direct power transfer.

FIG. 14 is a sectional view of a PPPEM, in another embodiment of the present invention, which utilizes a planetary rotor having flexible couplings to align the rotor output shaft coaxial with the axis of the stator for direct power transfer.

PPPEM 200 comprises an externally mounted, gearless, stator 164 provided with a series of electromagnets 42 mounted on coil cores 196. The series of electromagnets 42 are arranged radially about stator axis 52 which defines the centerline of PPPEM 200.

Internally mounted, gearless planetary rotor 162 is provided with at least a pair of elastomeric friction rings 158 to establish a constant, rolling force, shown as temporary pivot contact line 60 between gearless, planetary rotor 162 and gearless stator 164. The eccentric rotor axis 50 passes through an offset cam shaft 168, but is aligned to meet with and connect to an angled coupling rod 202 through a rotor flange 204 and then a first flexible coupling 206a.

The connection between coupling rod 202 and output shaft 74 is through a second flexible coupling 206b which restores the axis of PPPEM 200 from the eccentric rotor axis 50 through cam shaft 169 at the proximal end of PPPEM 200, shown aligned with stator axis 52 and output shaft 74. Output shaft 74, whose centerline is thus coaxial with stator axis 52, receives a direct power transfer along the common axis between them.

The entire mechanism of flexible couplings 206a/b and connecting rod 202 is advantageously housed within a tubular bearings element 176 disposed coaxially within planetary, gearless rotor 162 to reduce friction between moving parts. Flexible couplings 206a/b are of any kind known to those skilled in the art.

Figure 15C:
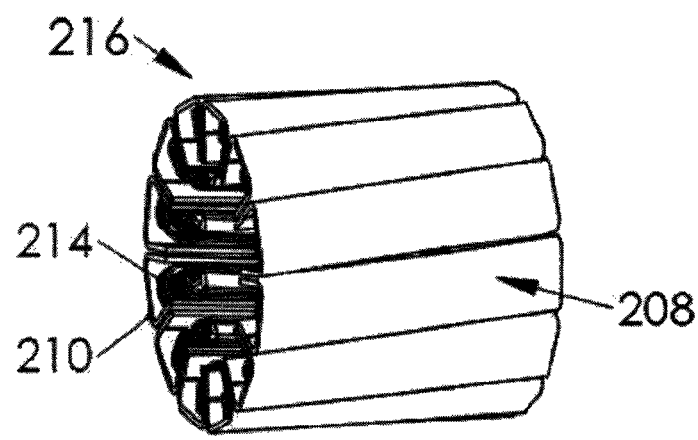
FIG. 15C is an orthographic view showing the details of the ring stator with a series of encased, E-shaped profile electromagnets from the PPPEM of FIG. 15B.
Figure 15B:
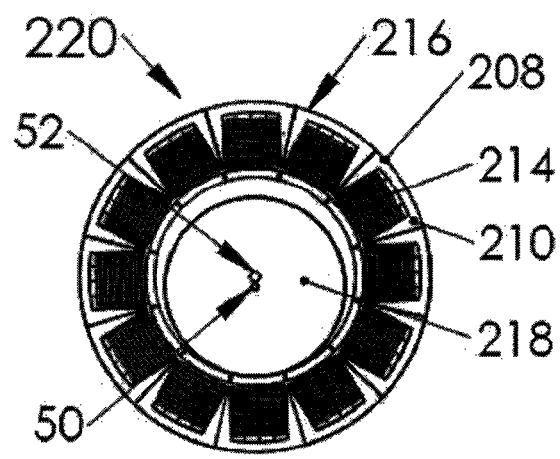
FIG. 15B is a sectional view of a PPPEM incorporating a series of the single, encased electromagnets of FIG. 15A, radially disposed within an externally mounted stator.
Figure 15A:
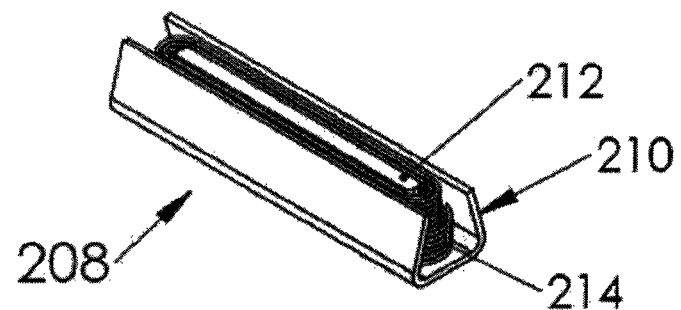
FIG. 15A is a detailed, orthographic view of a holder-encased electromagnet with an E-shaped profile constructed in accordance with another embodiment of the present invention.

FIG. 15A is a detailed, orthographic view of a holder-encased electromagnet with an integral, E-shaped profile core constructed in accordance with another embodiment of the present invention.

In FIGS. 15A/B/C, single electromagnet 208 comprises windings 214 wound on a central arm 212 of an E-shaped profile case 210.

It should be noted that an electromagnetic core in general may be configured with a C-shaped, U-shaped, or E-shaped profile, as known to those skilled in the art, to accommodate different numbers of coil windings for producing greater or lesser torque power from magnetic flux as may be required in different applications. This applies also to various embodiments of the PPPEM of the present invention.

FIG. 15B is a sectional view of a PPPEM incorporating a series of encased electromagnets of FIG. 15A, radially disposed within an externally mounted stator.

PPPEM 220 as shown in FIG. 15B, may be of either the gear type (see FIG. 2) or friction type (see FIG. 11), is constructed in accordance with the principles of the present invention and incorporates at least one electromagnet 208 encased in a housing 210 to optimize the volume of ring stator 216 to accommodate more electromagnet windings 214 configured in an E-shaped profile, within soft metal cases 210. This advantageously concentrates magnetic flux from both magnetic poles towards one active face of an electromagnet, such as central arm 212, in closest proximity to planetary rotor 218 when PPPEM 220 is activated. Planetary rotor 218 is shown in an axial sectional view to illustrate the eccentric relationship between rotor axis 50 and stator axis 52.

FIG. 15C is an orthographic view showing the details of the ring stator 216 with a series of encased, E-shaped profile electromagnets 208 of the PPPEM 220 of FIG. 15B.

Ring stator 216 of FIG. 15B is shown with a series of holder-encased electromagnets 208 arranged within ring stator 216 at an angle to the centerline of planetary rotor 218, but coaxial with and defined by rotor axis 50. The holder-encased electromagnets 208 are arranged at an angle within ring stator 216 primarily to optimize the volume of ring stator 216 to accommodate more holder-encased electromagnets 208.

Figure 16:
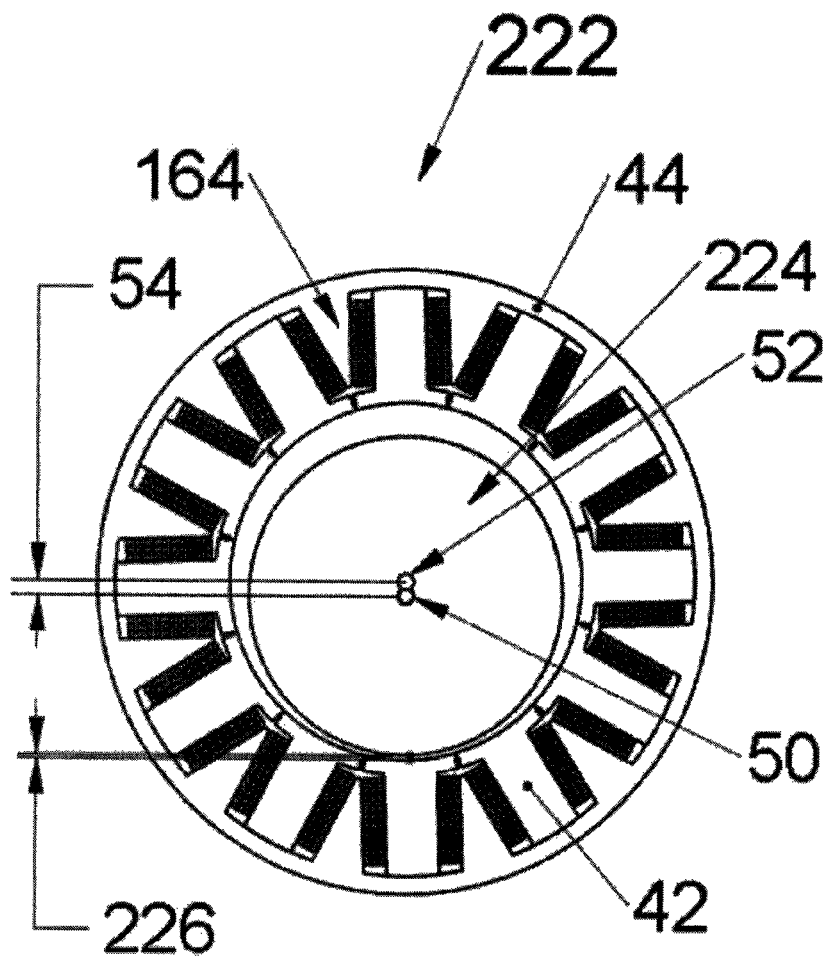
FIG. 16 is a sectional view of yet another embodiment of the present invention comprising a PPPEM with an internally mounted, planetary rotor 224 rotatably attached to an eccentric, rotatable camshaft (not shown, but oriented coaxially with planetary rotor axis 50), and an externally mounted stator.

FIG. 16 is a sectional view of another embodiment of the present invention comprising a PPPEM with an internally mounted, planetary rotor.

PPPEM 222 shown in FIG. 16 comprises an externally mounted, ring stator 164, shown disposed within a housing envelope 44; a series of electromagnets 42 internally arranged around ring stator 164; and an internally disposed, planetary rotor 224. Planetary rotor 224 is rotatably fixed on a cam shaft (not shown) coaxial with rotor axis 50. Ring stator axis 52 is offset from this by a minimum offset air gap 54 which allows for no direct rotor-to-stator contact at all, as reflected by the minimum clearance gap 226. The efficiency in the output of PPPEM 222, when operated in accordance with the principles of the present invention, is greatly increased by the very close proximity between planetary rotor 224 and ring stator 164 even without direct contact between them.

Planetary rotor 224, in a preferred embodiment of the present invention, is made from ferromagnetic material, such as soft iron, nickel, cobalt, ferrite, and the like, having a high magnetic permeability for use within a stator magnetic field.

Figure 17A:
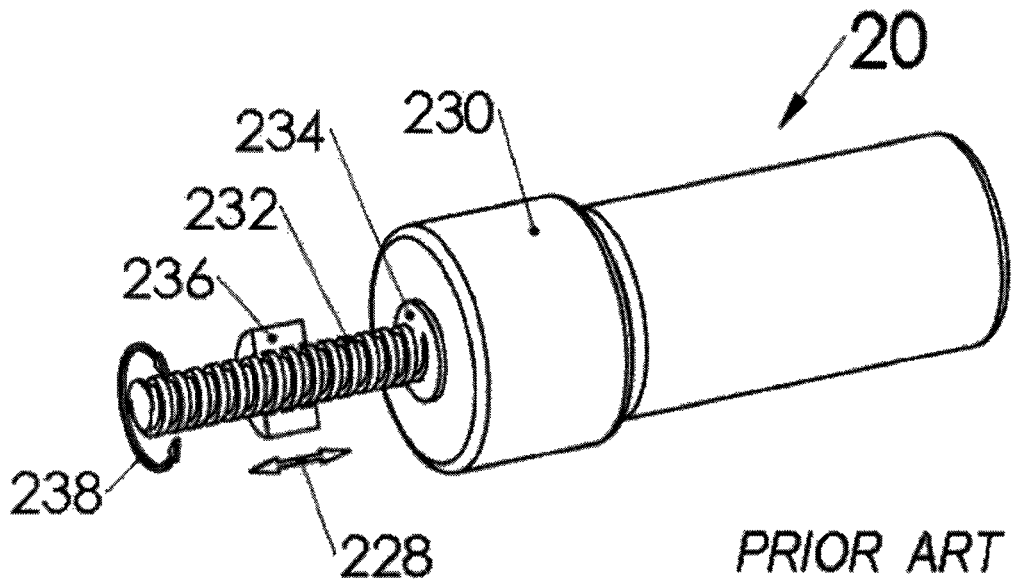
FIG. 17A is an orthographic view of a prior art motor connected to a lead screw shaft through a connection to a gear in a prior-art gear box.

FIG. 17A is an orthographic view of a prior art motor connected to a lead screw shaft through a prior art gear box. A prior art electric motor 20 is connected to a gear box 230 and connected through a flange 234 to drive a lead screw shaft 232 that provides output power as is known to those skilled in the art. Lead screw shaft 232 rotates as indicated by rotational arrow 238. A movable nut 236 travels laterally (shown by arrow 228) along the length of lead screw shaft 232 in either direction, in accordance with the direction of rotation, clockwise or counterclockwise, of lead screw shaft 232.

Figure 17B:
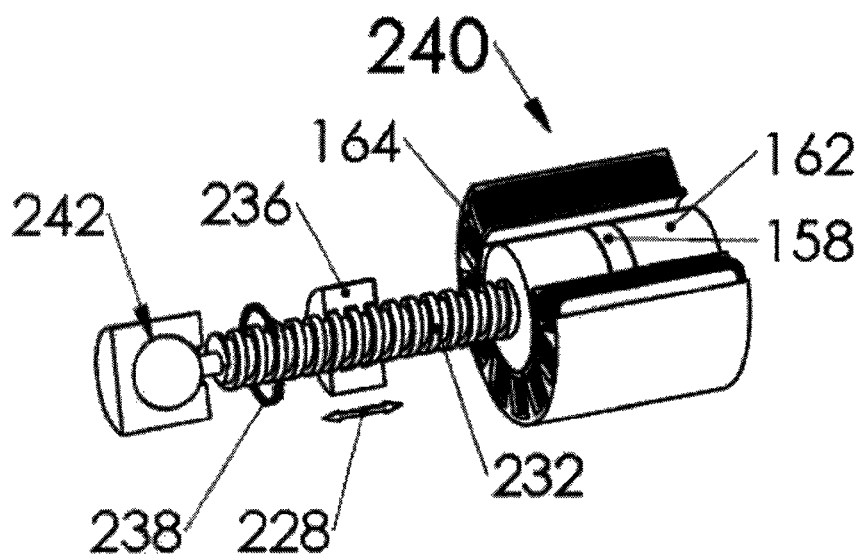
FIG. 17B is an orthographic, partially cut-away drawing of a PPPEM constructed with a gearless planetary rotor for direct operation of a lead screw shaft, in accordance with the principles of the present invention.

FIG. 17B is an orthographic, partially cut-away drawing of a PPPEM constructed with a gearless planetary rotor for direct operation of a lead screw shaft, in accordance with the principles of the present invention.

PPPEM 240 shown in FIG. 17B comprises an externally mounted friction-type stator 164 having a series of electromagnets 42 (see FIG. 11) and an internally mounted gearless planetary rotor 162 with at least one elastomeric friction ring 158. Planetary rotor 162 provides for direct control of a fixedly attached, rotatable lead screw shaft 232 which is rotatably attached at a distal end to a ball joint 242. Lead screw shaft 232 is provided with a laterally movable nut 236 which moves in either forward or backward direction along the axis of lead screw shaft 232 as indicated by double-headed arrow 228.

Planetary rotor 162 is gearless and integrally connected to lead screw shaft 232 such that rotation of planetary rotor 162 causes the direct rotation (rotation arrow 238) of lead screw shaft 232 without the need for connection to gears through a gear box 230 as used in the prior art (see FIG. 17A). The distal end of lead screw shaft 232 comprises a ball joint 242 to anchor lead screw shaft 232 while continuing to allow rotational movement so that movable nut 236 is free to move in either axial direction (arrow 228) along the fixed length of lead screw shaft 232 when motor 240 is operated. The direction of rotation of lead screw shaft 232, and hence the direction of lateral movement of movable nut 236, is directly dependent upon the clockwise or counterclockwise rotation (arrow 238) of rotor 162.

PPPEM 240 of the present invention shown in FIGS. 17A/B is an improvement over the prior art electric motor and useful for devices with movable elements requiring bi-directional back and forth movement, such as the zoom lenses in cameras, mobile portions of advertising displays, and the like. These movable elements are connected to movable nut 236 and move with it when PPPEM 240 is operated.

Figure 18A:
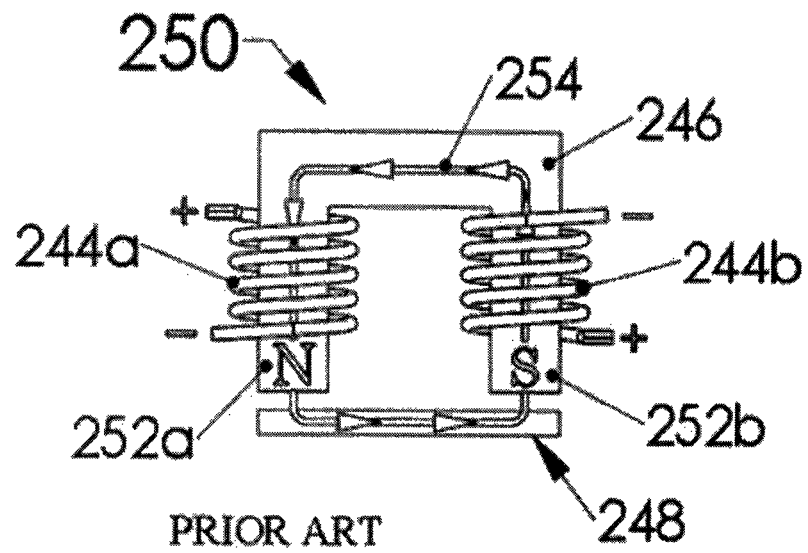
FIG. 18A shows a general schematic view of a typical prior art, U-shaped profile holding electromagnet.

FIG. 18A shows a general schematic view of a typical prior art, U-shaped profile holding electromagnet.

The prior art electromagnet 250 comprises a U-shaped profile, core 246 having ferromagnetic properties which has electrical coils 244a and 244b wound on polar arms 252a and 252b, respectively (shown as N=North; S=South, respectively) so that their polarities are oppositely charged. An armature 248 is provided to allow the magnetic field to flow in a closed circuit in the direction indicated by arrow 254.

Figure 18B:
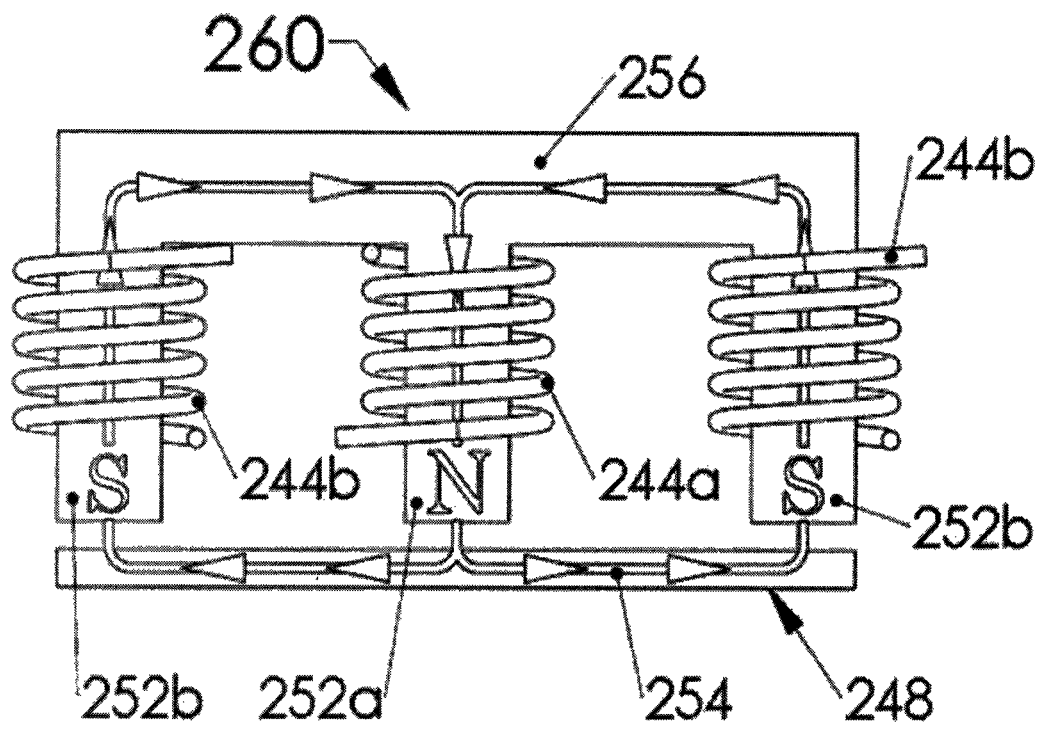
FIG. 18B shows a general schematic view of a typical prior art, E-shaped profile holding electromagnet.

FIG. 18B shows a general schematic view of a typical prior art, E-shaped holding electromagnet 260 having three arms 252b/a/b on a ferromagnetic core 256, each wound with electrical coils 244b/a/b and showing the flow (arrows) and polarity (North/South) of a resultant magnetic flux through the core 256 and an associated armature 248 when the electrical coils are activated.

The prior art electromagnet 260 of FIG. 18B comprises an E-shaped profile, core 256 having ferromagnetic properties which has electrical coils 244a and 244b alternatively wound, respectively, on the three adjacent polar arms 252b, 252a and 252b (shown as S=South, N=North; S=South, respectively) so that their polarities alternate between S-N-S (or optionally, N-S-N). An armature 248 is provided to allow the magnetic field to flow in a closed circuit, but unlike the flow in the U-shaped profile electromagnet 250 of FIG. 18A, the magnetic flow in the E-shaped profile electromagnet 260 follows dual paths, as indicated by arrow 254.

Figure 19A:
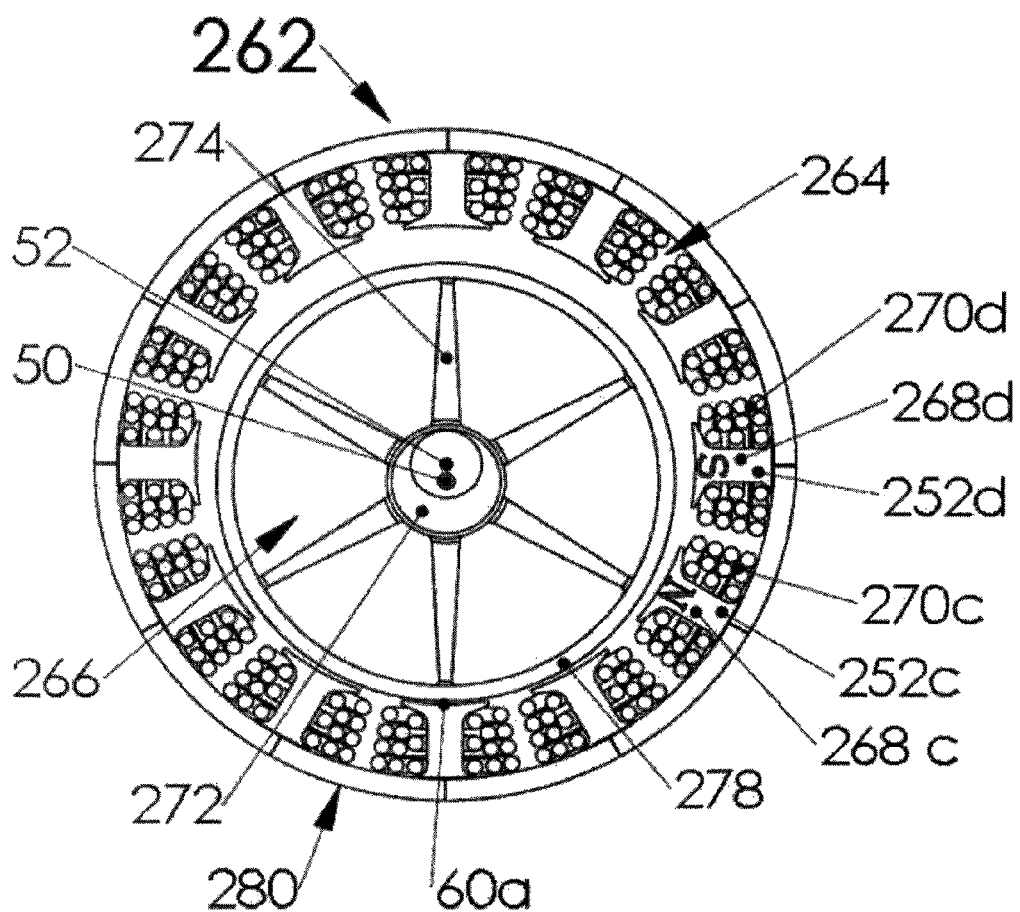
FIGS. 19A and 19B illustrate a typical two-step operation of a PPPEM having a series of U-shaped profile cores and constructed in accordance with the principles of the present invention.
Figure 19B:
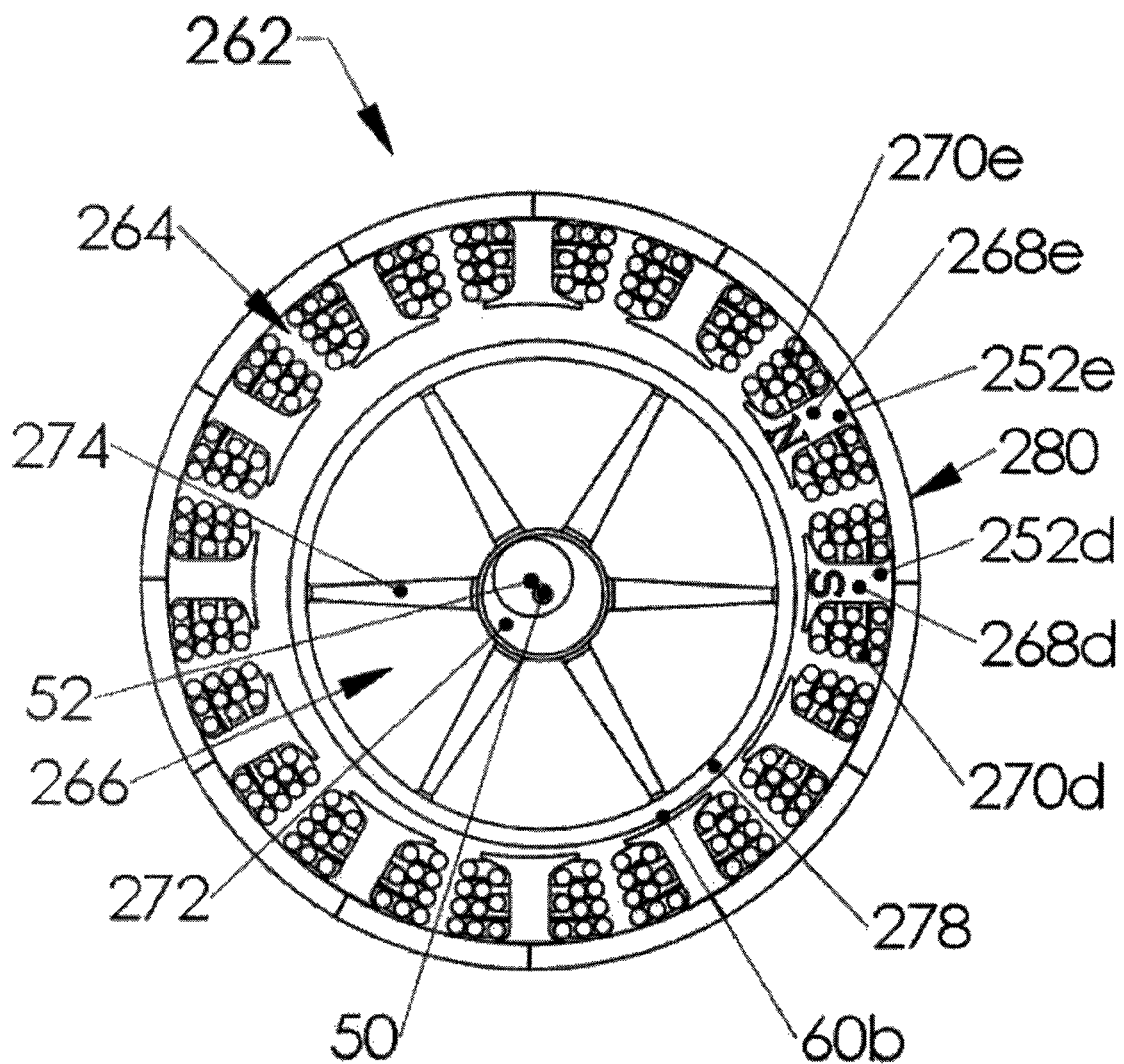

FIGS. 19A and 19B illustrate a typical two-step operation of a PPPEM constructed in accordance with the principles of the present invention. PPPEM 262 is provided with an externally mounted ring stator 264 whose stator axis 52 defines and is coaxial with the centerline for the output shaft (not shown) of PPPEM 262. An internally mounted, planetary rotor 266 comprises a tubular, soft iron, radial ring 278 having an integral rotor magnetic core 272. Rotor axis 50 is eccentric to the centerline axis of ring stator 264.

Ring stator 264 is provided with a series of electromagnets 268 (such as 268c/d in FIG. 19A and also, by way of example, 268e in FIG. 19B) with U-shaped profile cores 246 (see FIG. 18A), which are configured with a North (N) magnetic pole on one core arm 252c and a South (S) magnetic pole on the other core arm 252d. All the electromagnets 268 in ring stator 264 are disposed within stator 280. PPPEM 262 is enclosed in a motor housing 280 which also serves as a casing to ring stator 264.

Referring now to FIG. 19A in particular, ring stator 264 comprises a series of 12 electromagnets, by way of example, electromagnet 268c whose magnetic polarity is shown as N (North) on one arm 252c of a U-shaped profile core 246 (see FIG. 18A). On the second arm 252d, the magnetic polarity is shown as S (South) such that electromagnet 268c and adjacent electromagnet 268d are serially connected although their coil windings 270c and 270d, respectively, and create opposite magnetic polarity on each of the arms of the U-shaped profile core 246.

In a first step of operation, electromagnets 268c and 268d, although of opposite magnetic polarity, work in tandem (on the same U-shaped profile core 246—see FIG. 18A) to impel planetary rotor 266 to rotate in pivotal increments of 60 degrees in relation to the rotational movement of a cam shaft (not shown, but coaxial with eccentric rotor axis 50) from a first, moving pivot line 60a in a direction of rotation dependent on the pull forces when PPPEM 262 is operated.

Referring now to FIG. 19B, electromagnet 268d whose magnetic polarity is now shown as S (South) and electromagnet 268e whose magnetic polarity is now shown as N (North) have attracted tubular, soft iron ring 278 from a first, moving pivot line 60a (FIG. 19A) to a sequential, second pivot line 60b at about 30 degrees from the first, moving pivot line 60a.

Electromagnet coil 270d is serially connected through its windings to coil 270e which has a North (N) magnetic polarity and creates a new impetus for planetary rotor 266 to continue rolling. There are always at least two adjacent electromagnets 268 which operate together in series connection to pull planetary rotor 266 by creating opposite magnetic polarity on each of the arms 252d/e of the U-shaped profile core 246 (see FIG. 18A).

Figure 20A:
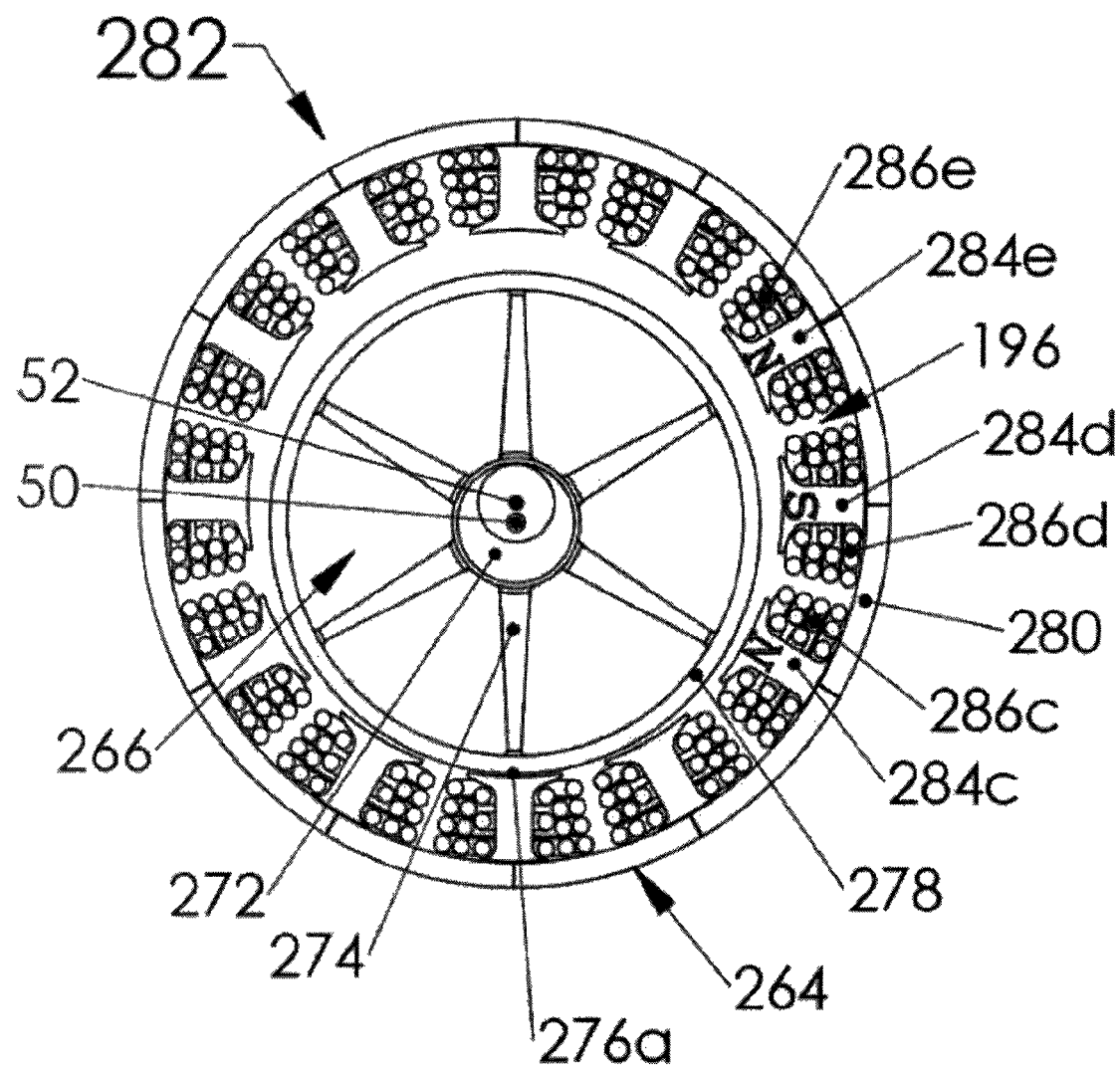
FIGS. 20A and 20B illustrate a typical two-step operation of a PPPEM having a series of E-shaped profile cores and constructed in accordance with the principles of the present invention.
Figure 20B:
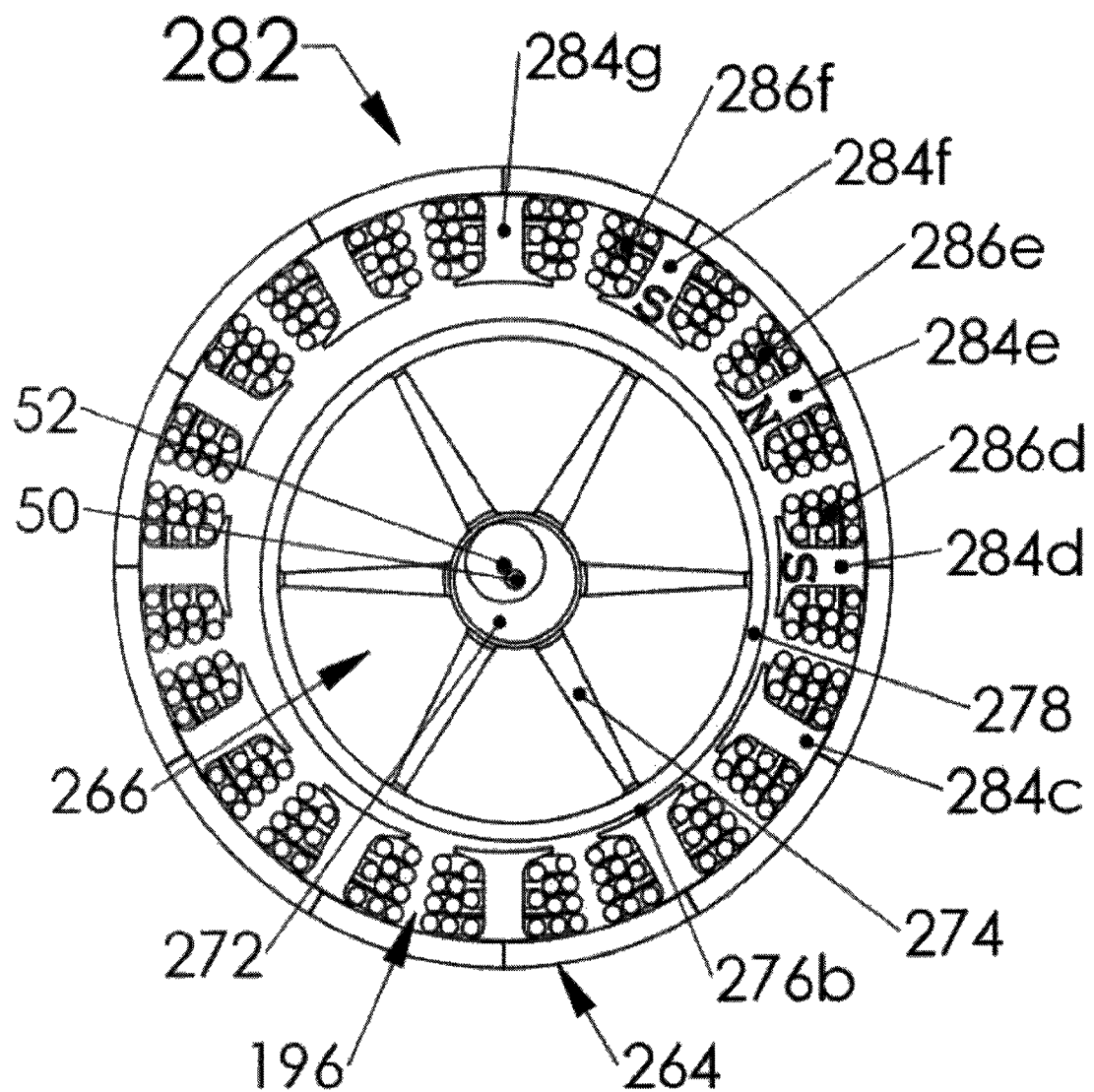

FIGS. 20A and 20B illustrate a typical two-step operation of a PPPEM having a series of E-shaped profile electromagnet cores and constructed in accordance with the principles of the present invention. In PPPEM 282 of FIGS. 20A/B, a group of coils 286c/d/e, such as in electromagnets 284c/d/e, are activated simultaneously, where the mean attracting vector of the three coils 286c/d/e always remains perpendicular to the rotor radius and oriented toward the temporary, rolling-motion pivot contact line 60a which is held in balance by the combination of magnetic forces.

Referring now in particular to FIG. 20A, PPPEM 282 comprises an externally mounted, ring stator 264, with a series of electromagnets, such as 284c/d/e provided with E-shaped profile cores 256 (see FIG. 18B) arranged around the central axis 52 of ring stator 264; and an internally disposed, planetary rotor 266 having a rotor magnetic core 272 integrally constructed with six arms 274 disposed equidistant from one another in a radial arrangement. The PPPEM 282 is housed in motor housing 280 while planetary rotor 266 is provided with a tubular, soft iron, radial ring 278 integral to planetary rotor 266.

PPPEM 282 is provided with coil windings 286 c/d/e which are serially connected so that the magnetic polarity of the middle core arm (marked S=South pole), by way of example, is opposite to that of the two adjacent end core arms (marked N=North). The same construction principle that applies to electromagnets 284c/d/e in ring stator 264 are also applicable to the other electromagnets 284 in groups of three.

In a preferred embodiment of the present invention, ring stator 264 is provided with 12 electromagnets 284, but any number of electromagnets having an E-shaped profile core 256 (see FIG. 18B) are usable. Contact pivot line 60a is shown disposed at a six o'clock position in relation to the axial sectional view of PPPEM 282, and therefore a first step in the operation of PPPEM 282 is the activation of electromagnets 284c/d/e to pivotally rotate planetary rotor 266 utilizing the magnetic force of attraction on planetary, rotor ring 278, which is advantageously made from soft iron.

The primary difference between the embodiments of the present invention shown in FIGS. 19A/B and FIGS. 20A/B is the use of a U-shaped profile core 246 (see FIG. 18A) for the electromagnets 268 in the former drawings, as opposed to the use of an E-shaped profile core 256 (see FIG. 18B) for the electromagnets in FIGS. 20A/B. Other features are primarily the same between the drawings, but there are some differences in operation as explained below, due to the difference between the physical nature of the U-shaped or E-shaped profiles of the electromagnet cores 246, 256 used in the various embodiments of the present invention.

In the embodiment of the present invention shown in FIGS. 20A/B/C, in PPPEM 282 illustrates a general example of the action of electromagnets 284. Movement of planetary rotor 266 results in a temporary mesh on the pivot contact line (such as 60a) formed tangentially along the circumference of planetary rotor 266 between the stator gear and a rotor gears (not shown) to provide torque to an output shaft (not shown).

Referring to FIG. 20B, a second pivot line 60b is now established in the five o'clock position between ring stator 264 and eccentric planetary rotor 266. Electromagnet 284c will be deactivated and electromagnet 284f at the nine o'clock position will be activated at the same time to continue the pivotal rolling motion of planetary rotor 266. Note that in this second step, electromagnets 284d/e/f are now activated. Further movement will result in continuous activation and deactivation of relevant electromagnets in a sequential, running series.

Figures 21A, 21B:
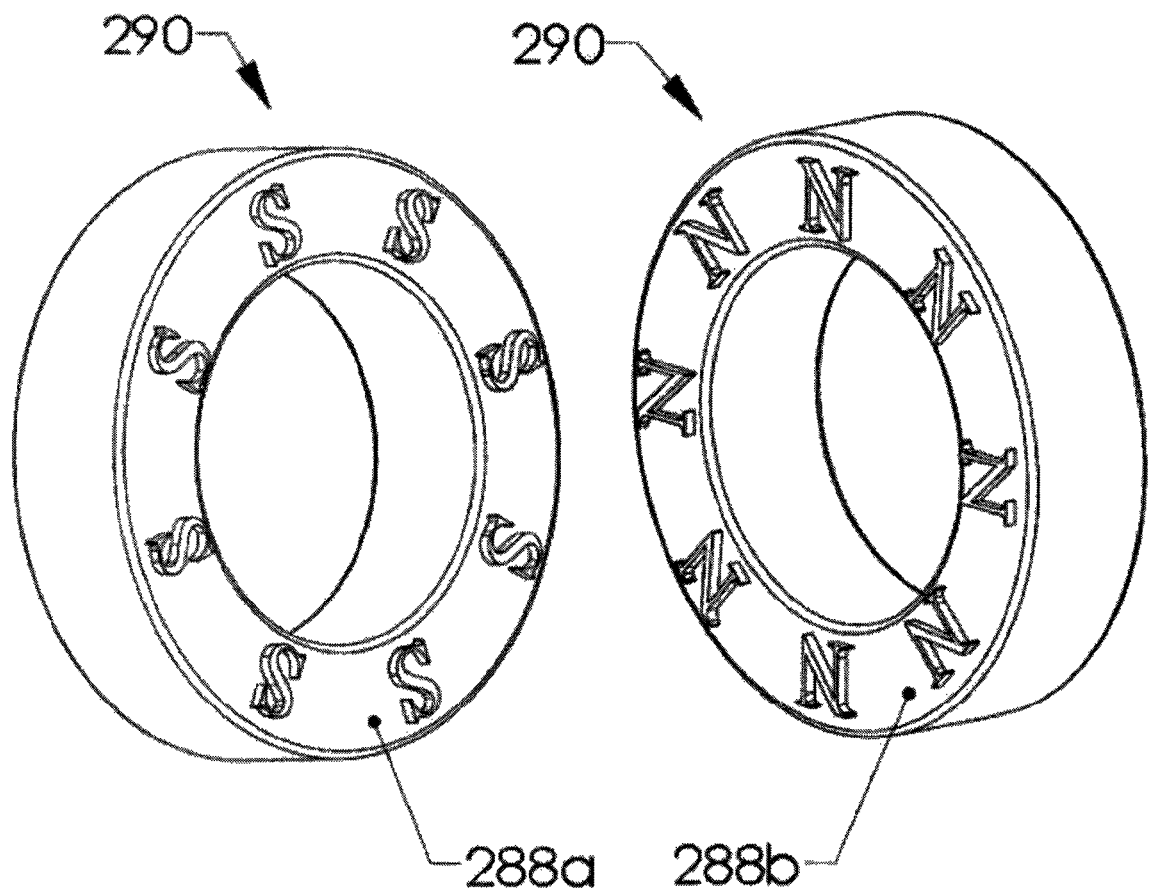
FIGS. 21A and 21B illustrate the front and back faces, respectively, of a prior art, axially oriented ring magnet showing the opposite polarities of each face.

FIGS. 21A and 21B illustrate the front face 288a and back face 288b, respectively, of a prior art ring-magnet 290 showing the opposite, axially oriented magnetic polarities (N and S) of each face. Ring magnet 290 may be a ring or a cylinder magnet, but they both have axially oriented magnetization and are quite commonly used since they are much cheaper to produce than radial magnets. In particular applications, the magnetic flux lines can be selected that are radially oriented and this face ring magnet can them be used in constructing an improved PPPEM combining conventional ring magnets with the push-pull advantages in accordance with the principles of the present invention.

Figure 22:
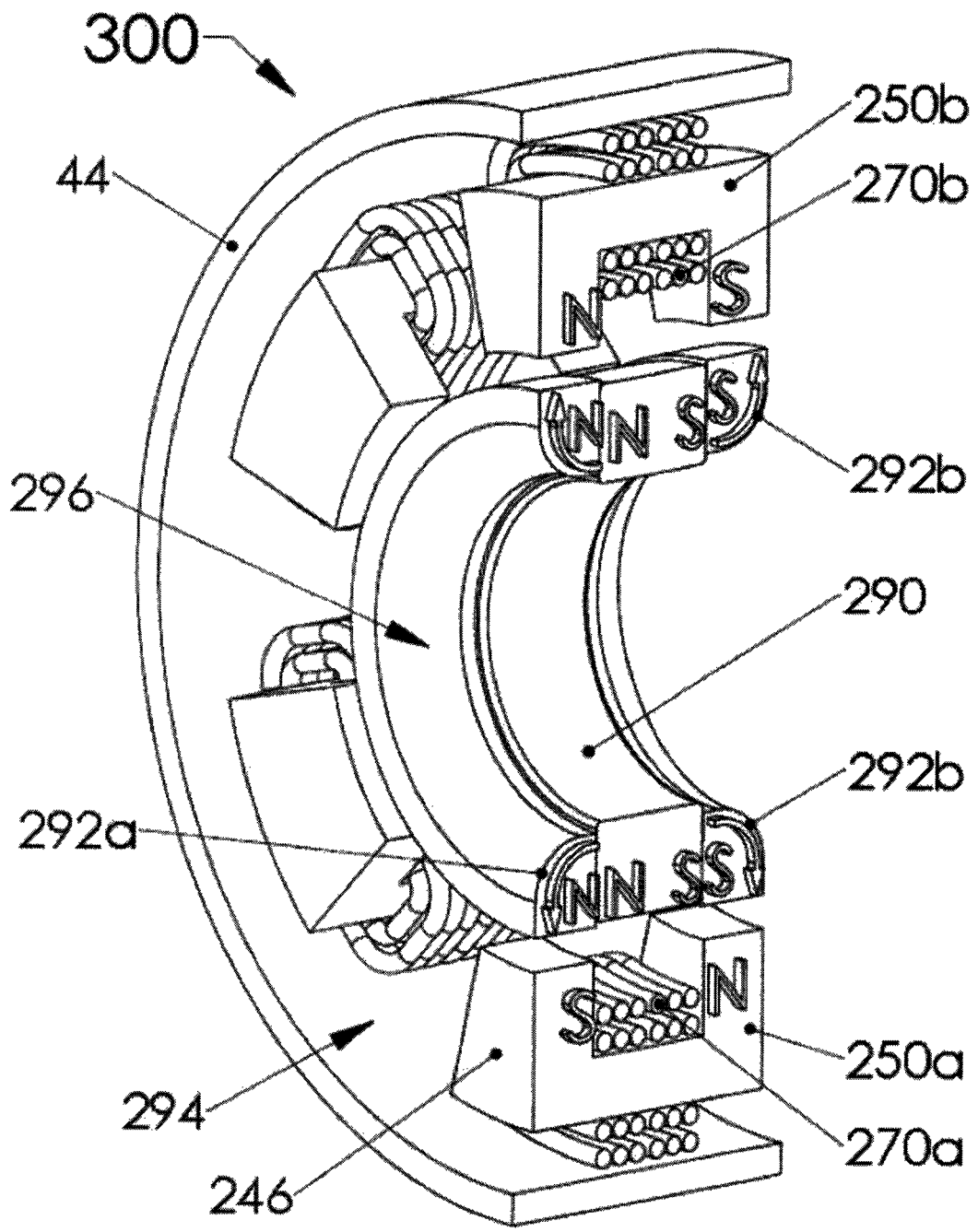
FIG. 22 shows a cross-sectional, orthographic view of another embodiment of the present invention.

FIG. 22 shows a cross-sectional orthographic view of a PPPEM comprising an externally mounted, ring stator with a series of electromagnets having windings on axially oriented U-shaped profile cores and constructed in accordance with another embodiment of the present invention.

PPPEM 300 comprises an externally mounted stator 294 with a series of electromagnets 250, each with a U-shaped profile core 246 having windings 270a/b, the whole being enclosed in a stator case 44 which conveniently also serves as a motor housing for PPPEM 300. An internally disposed planetary rotor 296 is formed from a conventional, prior art ring-magnet 290 which is axially oriented and capped on each face 288a/b (see FIGS. 21A/B) with a magnetic flux guide 292a/b.

Stator electromagnets 250a/b are operated in close proximity to the magnetic poles of magnetic flux guides 292a/b and rotor ring-magnet 290 when the opposite magnetic polarity is given to electromagnet 250a as that of the poles of magnetic flux guides 292a/b and rotor ring-magnet 290. This produces an attraction force that pulls rotor ring-magnet 290 in a downward direction.

Meanwhile, an electromagnet 250b disposed at an upper portion of PPPEM 300, shown in FIG. 22 above rotor ring-magnet 290, is given the same magnetic polarity as that of the poles of magnetic flux guides 292b and rotor ring-magnet 290. The sum of both repulsion and attraction magnetic forces acting downward impels a series of pivotal movements which results in production of a torque in an output shaft (not shown) which can be put to use in many applications within the power range of PPPEM 300.

Figure 23:
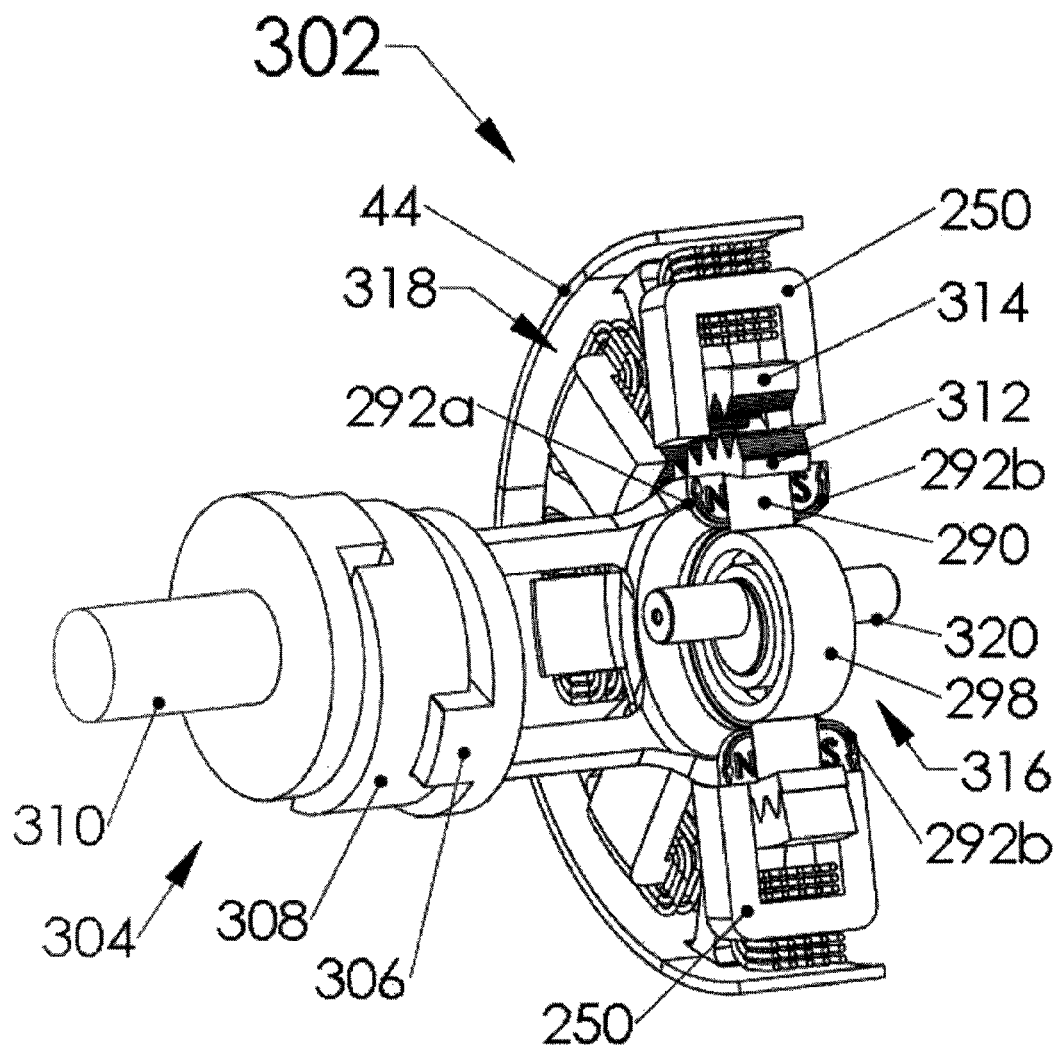
FIG. 23 is an orthographic, partially sectional view of still another embodiment of the present invention.

FIG. 23 is an orthographic, partially sectional view of still another embodiment of the present invention. FIG. 23 shows a PPPEM 302 with an externally mounted stator 318 integral to a stator ring-gear 314 which meshes with planetary rotor gear 312 when PPPEM 302 is operated. Electromagnets 250 with U-shaped profile cores 246 are arranged in a series in stator 318 and enclosed in a case 44.

An internally disposed planetary rotor 316 is provided with a rotor gear 312 and attached to an Oldham coupling device 304 through an Oldham rotor plate 306, mid-plate 308, and finally to an Oldham output shaft 310. The Oldham output shaft 310 is coaxial with the stator axis 52 (see FIG. 2) which defines the centerline of PPPEM 302 so that the offset between rotor axis 320 is restored coaxially with the stator axis 52 at output shaft 310. Planetary rotor 316 comprises an axial ring-magnet 290 provided with magnetic flux guides 292a/b. Other features displayed in FIG. 23 are as those described heretofore with regard to FIG. 22.

Figure 24:
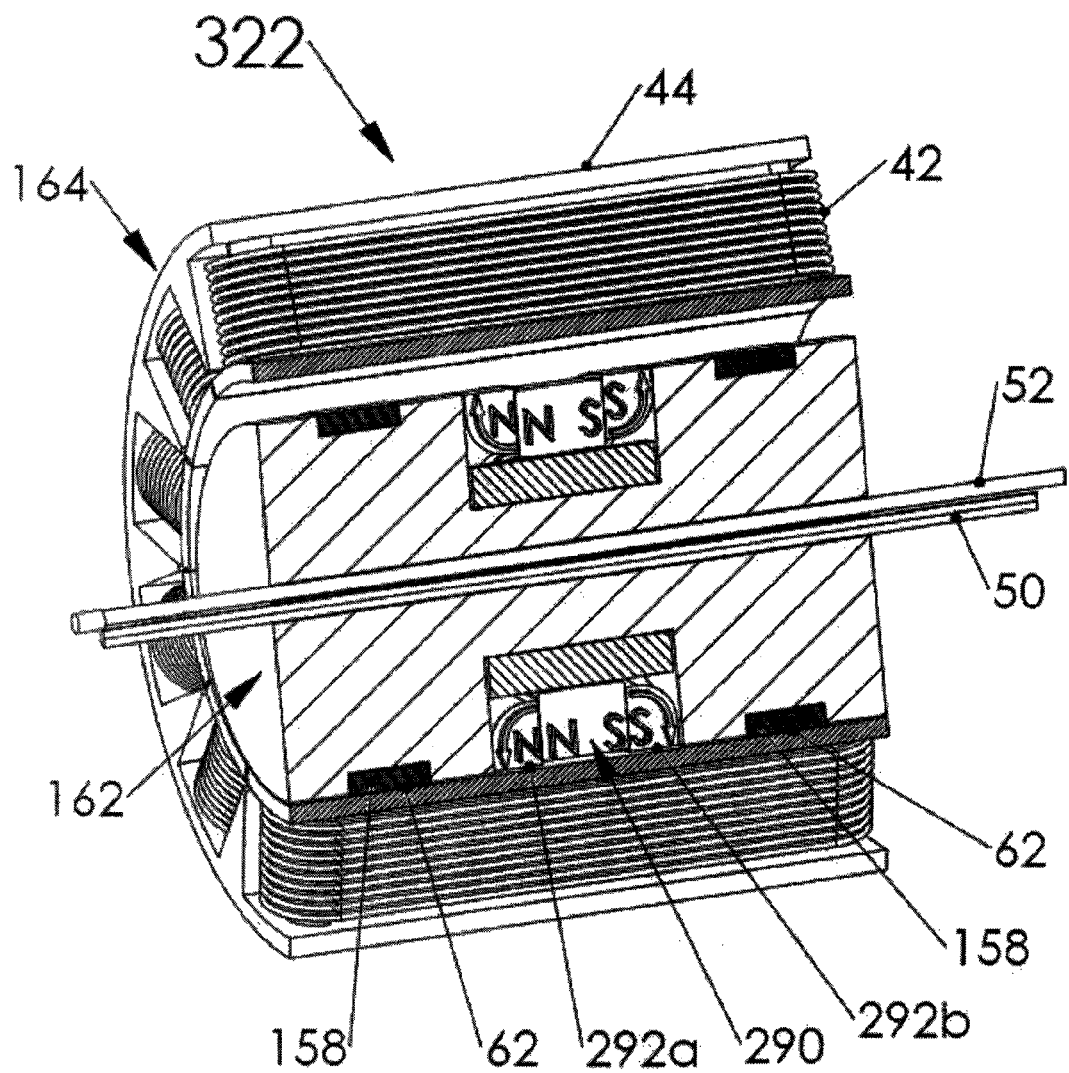
FIG. 24 is an orthographic, sectional view of a gearless PPPEM in a further embodiment of the present invention.

FIG. 24 is an orthographic, sectional view of a gearless, PPPEM in yet another embodiment of the present invention. PPPEM 322 is provided with an externally mounted stator 164 having a series of electromagnets 42, an internally disposed, gearless, planetary rotor 162, and provided with an anti-backlash mechanism (see FIGS. 13A/B), but also comprising prior art, axial ring-magnets 290 encapped on two faces with a pair of magnetic flux guides 292a/b. Other features and elements of PPPEM 322 are similar to those shown in the embodiment of the present invention shown in FIG. 11.

The principle feature of the embodiment shown in FIG. 24 is the improved anti-backlash mechanism which operates to pull planetary rotor 162 in a downward direction by force of attraction between planetary rotor 162 and ring stator 164, by using an axial ring-magnet 290 (with or without magnetic flux guides 292a/b that are rigidly connected to and are a part of planetary rotor 162, which will provide increased attraction between planetary rotor 162, made, preferably of soft ferromagnetic iron material, and ring stator 164.

Figure 25:
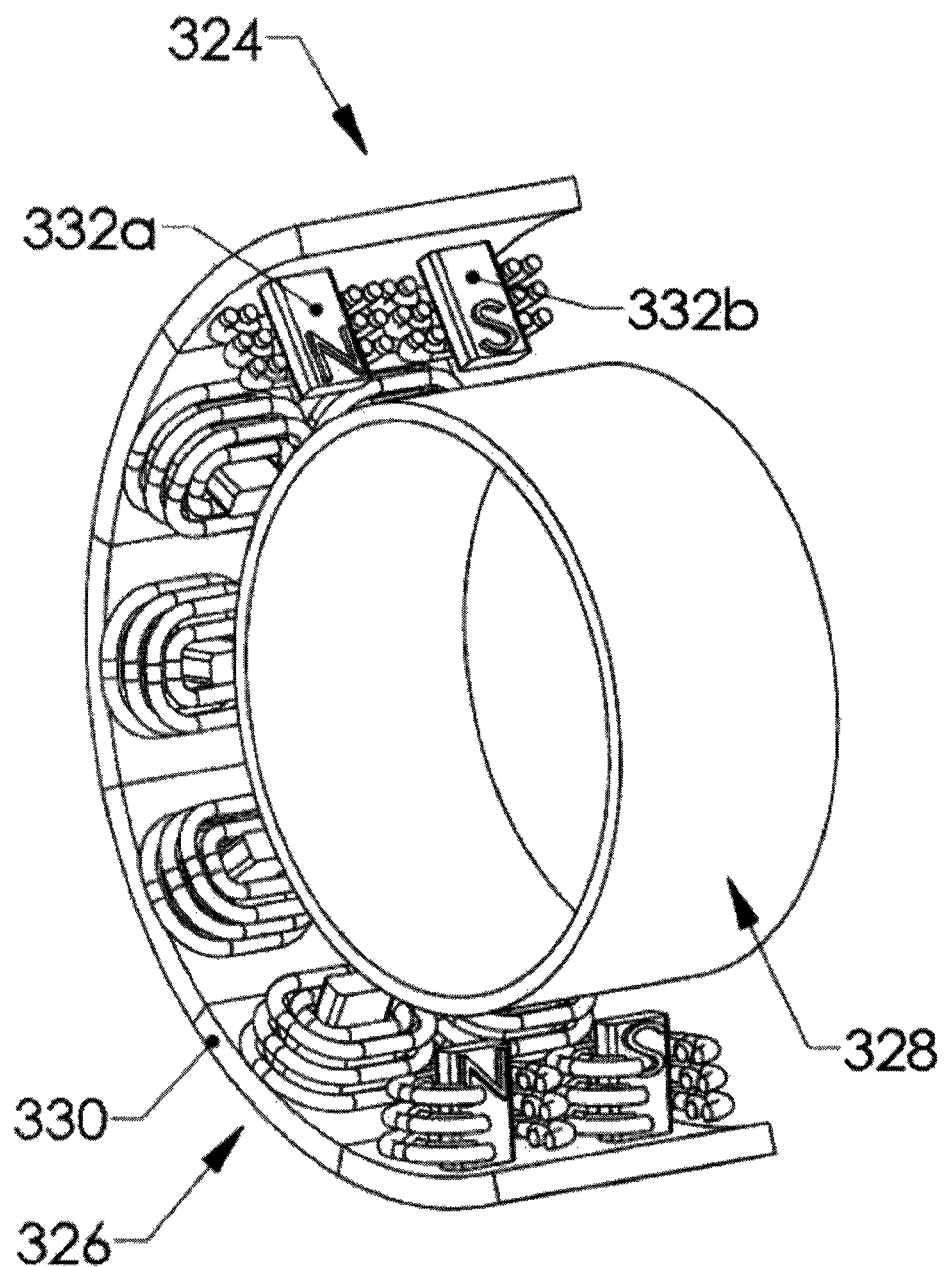
FIG. 25 is an orthographic, partially sectional view of yet another embodiment of the present invention.

FIG. 25 is an orthographic, partially sectional view of another embodiment of the present invention. FIG. 25 shows a PPPEM 324 constructed with multiple, relatively thin, U-shaped profile electromagnet core arms 332a (N pole) and 332b (S pole) axially arranged on a wide, inner backing surface 330 of an external ring stator 326 to accommodate multiple N and S magnetic poles 332a/b for magnetically rotating an internally disposed, soft metal rotor ring 328. Rotor ring 328 may be made of other ferromagnetic materials known to those skilled in the art, but herein the preferred material is soft iron.

Figure 26:
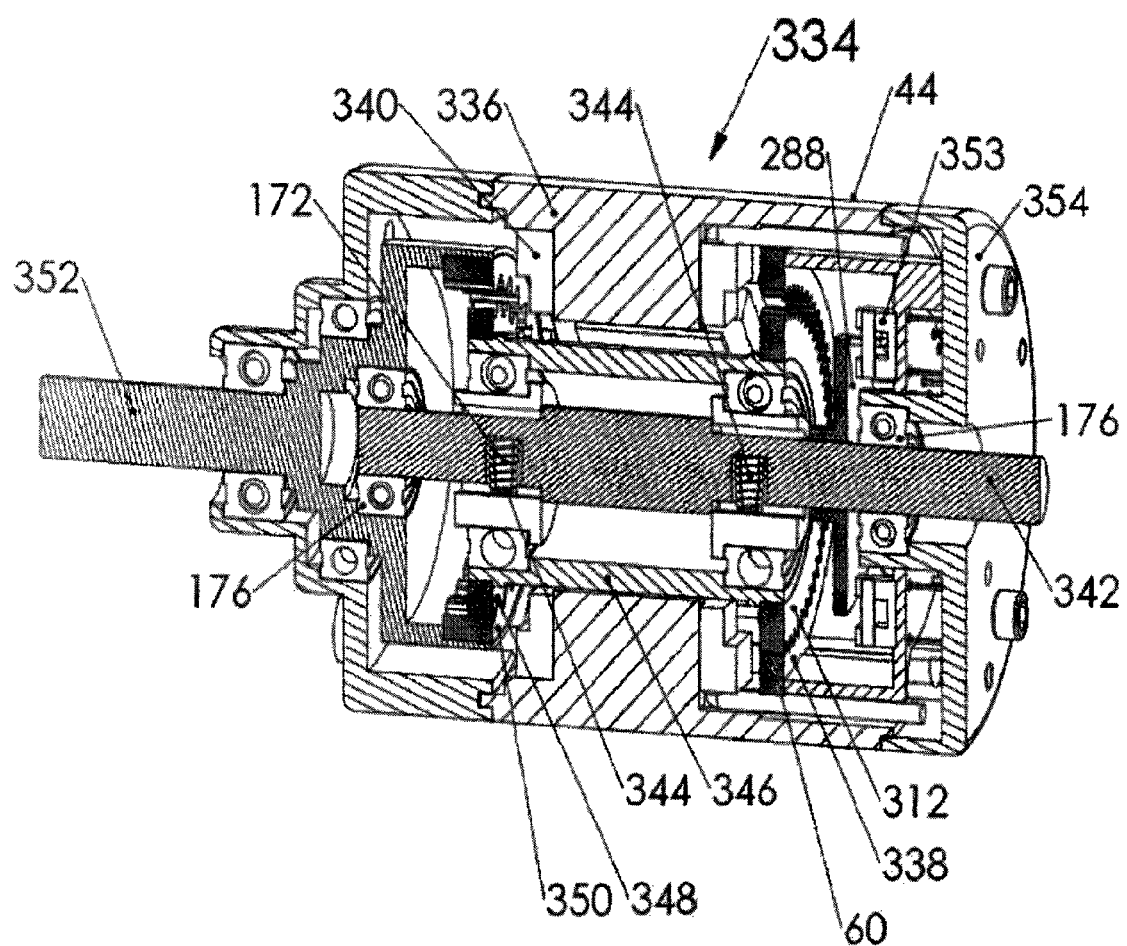
FIG. 26 is an orthographic, sectional view of still another [?] embodiment of the present invention.

FIG. 26 is an orthographic, sectional view of a preferred embodiment of the present invention. FIG. 26 shows a PPPEM 334 comprising an externally mounted stator 336 with a stator gear 338 and stator electromagnets 340 arranged radially in a series about a central stator axis 52 (see FIG. 2) coaxial with the axis of PPPEM 334 output shaft 352. An offset, rotor cam shaft 342 is provided with an anti-backlash mechanism 344 which may be any type known to those skilled in the art, but preferably comprises a pair of compression springs 172, as shown in detail in FIG. 13A.

Internal planetary rotor 346 shown in FIG. 26 is equipped with a first rotor ring-gear 312 in mesh contact with stator gear 338 at moving, contact pivot line 60. A second rotor ring-gear 348 is in mesh contact with output ring-gear 350 for both converting planetary rotor eccentric rotation into a concentric output rotation for output shaft 352, and as an output reduction stage of, for example, about 1:20. In this way, therefore, offset, rotor cam shaft 342 is the perfect place to implement a shaft encoder, resolver, and/or a brake.

Ring 288 is attached to offset, rotor cam shaft 342 and acts as an interrupter to the photo interrupter sensors 353 in order to detect the relative orientation of pivot contact line 60 to the electromagnets 340. A secondary set of planetary gears 348 and 350 are either for speed reduction moment multiplication or for bringing output shaft 352 concentric to that of the stator centerline, defined by ring stator axis 52 (see FIG. 2).

A pair of compression springs 172 (see detail view in FIG. 13A) of anti-backlash mechanism 344 are loaded for rotor ring-gears 312 and 348 to engage with stator ring-gear 338 and output gear 350 for producing the two-stage, anti-backlash mechanism.

It should be noted that PPPEM 334 has three main rotating elements:
1) the planetary rotor 346 with its integral gears 312, 348;
2) the eccentric, rotor cam shaft 342, which rotates at relatively higher speed than that of planetary rotor 346 (for example, the eccentric, rotor cam shaft 342 will rotate 15 or 30 times faster than the speed of planetary rotor 346); and
3) the output shaft 352 with its integrated, internal ring-gear 350 which rotates at a relatively lower speed than that of planetary rotor 346.

Planetary rotor 346 is the element that is impelled by electromagnets 340 and will transfer a given torque in a certain direction and at a given speed to the second output planetary mesh gears 348, 350, of output shaft 352. The offset, rotor cam shaft 342 is intended to keep planetary rotor 346 at a given offset and at a parallel orientation in relation to ring stator axis 52. Since offset, rotor cam shaft 342 rotates at a speed multiple to that of planetary rotor 346, it is the optimal element for placing any kind of sensor, either for indicating position or velocity, or for accommodating a holding brake, which is a very low torque brake (for example, the brake holding torque will be 15 times less than the maximum rotor torque).

An optical absolute encoder, constructed of washer plate 288 and about eight photo-interrupter sensors 353, is used to identify rotor-to-stator relative position, and in particular the relative position of the rotor pivot contact line 60 in relation to the magnetic poles of the stator electromagnets 340.

Washer plate 288 is rotatably fixed with offset, rotor cam shaft 342 where the photo interrupters 353 are fixedly connected to a stator case 44 including motor rear cover 354.

As is known to those skilled in the prior art, the relative location of a given pivot contact line to the stator electromagnets 340 is essential for their optimal activation and for impelling planetary rotor 346 to rotate in a clockwise or counter-clockwise direction at one of maximum moment and maximum efficiency.

It will therefore be appreciated that the device described herein and illustrated in the accompanying drawings is set forth merely for purposes of example and that many other variations, modifications, and applications of the present invention may be made. Having described the present invention with regard to certain specific embodiments thereof, it is to be understood that the description is not meant as a limitation, since further modifications may now become apparent to those skilled in the art, and it is intended to cover such modifications as fall within the scope of the description, drawings, and appended claims.

We claim:

1. A PPPEM comprising:
a stator internally mounted on a stator output shaft and disposed on a stator axis collinear with a central axis of said PPPEM, said stator being integrally formed with an external stator gear;
a series of push-pull electromagnets for generating push-pull radial magnetic forces disposed radially around said stator axis defining a stator centerline;
a planetary rotor having a rotor axis eccentric to said stator axis and comprising an external, rotatably mounted, rotor ring formed integrally with a rotor ring-gear; and
a step-gear integrally formed with said planetary gear, said step-gear being axially aligned with said stator centerline and in planetary mesh contact with an eccentric output ring-gear, such that when said PPPEM is operated, said step-gear acts as a reducer, being disposed coaxially with said stator so as to provide a high gear-ratio directly to said output ring-gear by eliminating the eccentricity between said stator axis and said rotor axis,
wherein when said series of push-pull electromagnets is sequentially activated, said rotor ring is impelled by said push-pull radial magnetic forces to roll about a continuous series of moving tangential contact lines formed by the temporary, sequential, mesh contacts between said rotor ring-gear and said stator gear, such that said planetary rotor advances around the outer circumference of said internally mounted stator in a continuous rolling motion providing a source of power output from said PPPEM.

2. A planetary push-pull electromagnetic motor (hereinafter, 'PPPEM') having an output shaft and comprising:
a stator fixedly mounted on a central axis of said PPPEM, wherein said central axis defines a stator centerline;
a planetary rotor arranged to be magnetically movable, rotatably mounted in minimal, close proximity to said stator on a planetary rotor output shaft having an eccentric rotor axis with respect to said stator centerline;
a series of electromagnets integral to said stator and radially mounted about said stator centerline for generating push-pull radial magnetic forces upon the magnetic materials of said planetary rotor in closest proximity to said series of electromagnets, when activated; and a means for transferring rolling motion of said eccentric planetary rotor into rotational motion along an axis aligned with said stator centerline to directly power said output shaft of said PPPEM, wherein when said series of electromagnets is activated, radial push-pull magnetic forces are generated, magnetically impelling said planetary rotor in proximal radial contact with at least one electromagnet in said series, said proximal radial contact defined by a temporary, moving pivot line being formed tangentially between said planetary rotor and said stator when in said minimal close proximity, such that said planetary rotor pivots from one of said pivot lines to an adjacent one in sequence about said stator, effecting a continuous rolling motion of said planetary rotor about said eccentric rotor axis and creating a rotary moment, said motion being translated into rotational motion which, when applied to said output shaft of said PPPEM utilizing said rotation transferring means, provides a source of power output from said PPPEM.

3. The PPPEM of claim 2, wherein said stator is a ring stator and said planetary rotor is provided with at least one rotor friction ring fixedly mounted about an outer surface thereof in tangential friction contact with said ring stator, such that when operated, said PPPEM is characterized as operating as a friction-type motor.

4. The PPPEM of claim 2, wherein said stator is provided with an integral stator ring-gear and said eccentric planetary rotor is provided with an integral planetary rotor gear that act as a primary, planetary mesh gear-set, such that when operated, said PPPEM is characterized as operating as a gear-type motor.

5. The PPPEM of claim 4, wherein said planetary gear rotor is radially loaded upon said stator ring-gear at said central axis thereof such that said radial magnetic forces pull said planetary gear rotor toward said stator ring-gear in order to ensure zero backlash when said planetary rotor gear and said stator ring-gear are in constant mesh contact and said PPPEM is operated.

6. The PPPEM of claim 4, wherein said planetary rotor gear is provided with an anti-backlash mechanism comprising a balanced pair of radial magnet-rings which produce a constant magnetic attraction force between said planetary rotor and said ring stator to maintain constant mesh contact when said PPPEM is operated.

7. The PPPEM of claim 4, wherein said PPPEM further comprises a tubular, bearings element comprising:
  a compression spring;
  a spring shoe element driven by said compression spring;
  an eccentric rotor cam shaft for housing said compression spring and spring shoe element; and
  bearings rotatably confined within an inner and outer tube of said tubular, bearings element;
  wherein said eccentric rotor cam shaft, said compression spring, and said spring shoe element are accommodated within a hollow core of said tubular, bearings element; and
  wherein when said compression spring compresses said spring shoe element mounted within said cam shaft, radial force is applied against said planetary rotor gear for positive, gear-tooth meshing with said stator ring-gear without backlash.

8. The PPPEM of claim 4, further comprising an internally mounted step-gear integrally formed with said planetary gear rotor, having an output rotor ring-gear, said output rotor ring-gear in planetary mesh contact with said step-gear, said step-gear and said output ring-gear each being rotatable at different speeds and forming a secondary planetary gear set in mechanical communication with an output shaft of said PPPEM to provide said PPPEM with power output.

9. The PPPEM of claim 4, wherein said planetary rotor gear is impelled by the magnetic field of said electromagnets to rotate about said eccentric rotor axis when activated while maintaining a minimal gap with said integral stator ring-gear,
  wherein said stator ring-gear, and said planetary rotor gear acting as a planetary gear set are kinetically supported by at least one additional pair of output mesh gears in mechanical communication with the respective gears of said planetary gear set.

10. The PPPEM of claim 4, further comprising an internally mounted, output step-gear.

11. The PPPEM of claim 4, further comprising an externally mounted, output step-gear.

12. The PPPEM of claim 4, wherein said planetary mesh gears have a diameter larger than the diameter of said planetary rotor.

13. The PPPEM of claim 4, wherein said planetary mesh gears have a diameter smaller than the diameter of said planetary rotor.

14. The PPPEM of claim 4, wherein said planetary rotor output shaft and an associated eccentric cam shaft comprise two, independent, output shaft elements, each rotatable at a different speed than the other.

15. The PPPEM of claim 14, wherein said associated cam shaft accommodates an add-on device selected from at least one of a low-torque electrical brake, an optical encoder/resolver, and combination of the two.

16. The PPPEM of claim 2, wherein said push-pull radial magnetic forces generated by said series of radially oriented electromagnets interacting with a radial rotor magnet produce vectors which are radially directed inwardly toward and outwardly about said eccentric rotor axis.

17. The PPPEM of claim 2, wherein said eccentric rotor axis of said planetary rotor is oriented in parallel with said central axis of said ring stator, but has a radial degree of freedom.

18. The PPPEM of claim 2, wherein said PPPEM comprises only a segmental portion of said ring stator and a like, respective portion of said series of electromagnets, said PPPEM having at least two segments of 30° of said radially mounted said series of electromagnets.

19. The PPPEM of claim 2, wherein said planetary rotor is preferably made from a soft-metal material having magnetic properties.

20. The PPPEM of claim 2, wherein said radial magnet is formed as a tube.

21. The PPPEM of claim 2, wherein said planetary rotor is formed as a tubular ring.

22. The PPPEM of claim 21, wherein said tubular ring comprises an axial tubular magnet having magnetic flux guides, said magnetic flux guides converting axial flux to radial flux which flows towards the core arms of said U-shaped electromagnet so as to merge radially with the magnetic flux therein.

23. The PPPEM of claim 2, wherein said series of electromagnets, when simultaneously activated, enables accurate control of a position of said planetary rotor in a steady state condition when aiming, following, and acting as a slave to a target.

24. The PPPEM of claim 2, further comprising an indicator, wherein said indicator comprises a Hall Effect sensor mounted on said ring stator; and at least one permanent magnet mounted on said output shaft in proximity to said Hall Effect sensor, wherein, when said PPPEM is operated, said indicator measures: relative position in between said output shaft and said electromagnets, and the speed and direction of rotor rotation of said PPPEM.

25. The PPPEM of claim 2, further comprising:

a coupling rod;

a pair of flexible couplings attached at each end of said coupling rod;

a tubular bearings element for housing said coupling rod and said pair of flexible couplings, wherein a first of said pair of flexible couplings is connected to said planetary rotor through a flange at said eccentric rotor axis, and a second of said pair of flexible couplings is connected to said output shaft along the central axis thereof aligned with the said central axis of said ring stator.

* * * * *